(12) United States Patent
Miller

(10) Patent No.: US 12,409,873 B2
(45) Date of Patent: Sep. 9, 2025

(54) SYSTEM AND METHOD OF RAILROAD TRACK DATA AGGREGATION AND ANALYSIS FOR DETERMINING INSPECTION FREQUENCY

(71) Applicant: BNSF Railway Company, Fort Worth, TX (US)

(72) Inventor: Adam L. Miller, Broomfield, CO (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

(21) Appl. No.: 18/321,093

(22) Filed: May 22, 2023

(65) Prior Publication Data

US 2023/0331271 A1   Oct. 19, 2023

Related U.S. Application Data

(63) Continuation of application No. 17/721,287, filed on Apr. 14, 2022, now Pat. No. 11,654,946.

(51) Int. Cl.
  *B61L 27/53* (2022.01)
  *B61L 23/04* (2006.01)
  *G06Q 10/20* (2023.01)

(52) U.S. Cl.
  CPC ............ *B61L 27/53* (2022.01); *B61L 23/042* (2013.01); *G06Q 10/20* (2013.01)

(58) Field of Classification Search
  CPC ........ B61L 27/53; B61L 27/042; G06Q 10/20
  See application file for complete search history.

(56) References Cited

U.S. PATENT DOCUMENTS

| 7,164,975 B2 | 1/2007 | Bidaud |
| 9,441,956 B2 | 9/2016 | Kainer et al. |

(Continued)

FOREIGN PATENT DOCUMENTS

| GB | 2586659 A | * 3/2021 | ............ F17D 5/005 |
| JP | 6935031 B1 | 9/2021 | |
| WO | 2021001219 A1 | 1/2021 | |

OTHER PUBLICATIONS

Sato, JP-2005284712-A, see English Translation (Year: 2005).*

(Continued)

*Primary Examiner* — Michael J Dalbo
(74) *Attorney, Agent, or Firm* — Whitaker Chalk Swindle & Schwartz PLLC; Enrique Sanchez, Jr.; Bradley J. Birchfield

(57) ABSTRACT

A system and method for minimizing safety hazards along a railroad track by optimizing visual railroad inspection frequency based on acquired data relating to railroad safety maintenance. The system and method can provide various rating systems for the railroad assets to optimize railroad inspections by focusing the inspections to railroad assets experiencing suboptimal conditions. The ratings of the railroad assets are based on various data collected from physical factors impacting the life of the railroad assets, such as an amount of rainfall, locomotive weight and frequency of passing, and manually detected defects. The system and method can focus the railroad inspection efforts to the railroad assets requiring increased attention in response to the suboptimal conditions. The focused inspections can result in longer lifespan of the railroad assets, efficient inspections, and safer railroads.

20 Claims, 9 Drawing Sheets

(56) References Cited

U.S. PATENT DOCUMENTS

| | | | |
|---|---|---|---|
| 2010/0057512 A1* | 3/2010 | Tays | B61L 23/04 |
| | | | 705/317 |
| 2014/0069193 A1 | 3/2014 | Grahm et al. | |
| 2014/0142868 A1 | 5/2014 | Biduad | |
| 2014/0164039 A1 | 6/2014 | Mitti et al. | |
| 2015/0308927 A1 | 10/2015 | Kono | |

OTHER PUBLICATIONS

Federal Railroad Administration, Track Safety Standards Compliance Manual, updated Dec. 12, 2008, avialble at https://railroads.dot.gov/sites/fra.dot.gov/files/2020-08/2008_Track_Safety_Standards%20%281%29.pdf (Year: 2008).*

Ben Franklin Transit, 2017-2022 Transit Development Plan, avialable at https://www.bft.org/assets/1/6/2017-2022-tdp.pdf (Year: 2017).*

CN 104015756—English Translation (Year: 2014).*

Liu, Optimizing Rail Defect Inspection Frequency to Reduce the Risk of Hazardous Materials Transportation by Rail, Dec. 31, 2017.

Faeze-Ghofrani, Predicting rail defect frequency: An integrated approach using fatigue modeling and data analytics, May 31, 2019.

Matiwos, Railway Track Inspection and Maintenance Scheduling For Addis Ababa Light Rail Transit, Aug. 31, 2016.

Fontul et al., Railway Track Condition Assessment at Network Level by Frequency Domain Analysis of GPR Data, Apr. 5, 2018.

Union Pacific, Union Pacific Railroad Engineering Track Maintenance Field Handbook, Sep. 28, 2020.

Rahimikelarijan et al., Imperfect Condition-Based Maintenance Strategy for a Deteriorating Rail Track System with Multiple Competitive Failure Modes, Dec. 31, 2020.

Dick C. Tyler et al: "Analysis of Factors Affecting the Location and Frequency of Broken Rails", Jan. 1, 2001 (Jan. 1, 2001), XP093064899.

International Preliminary Report on Patentability for PCT/US2023/016836; dated Oct. 24, 2024; 16 pages.

* cited by examiner

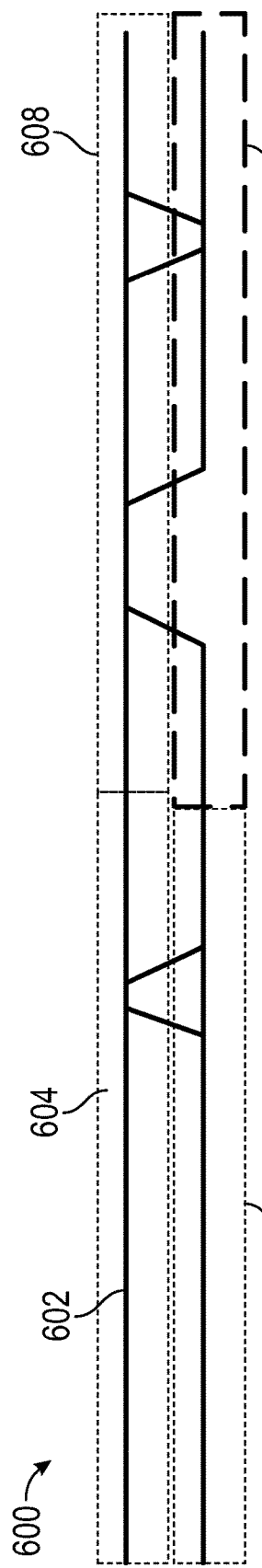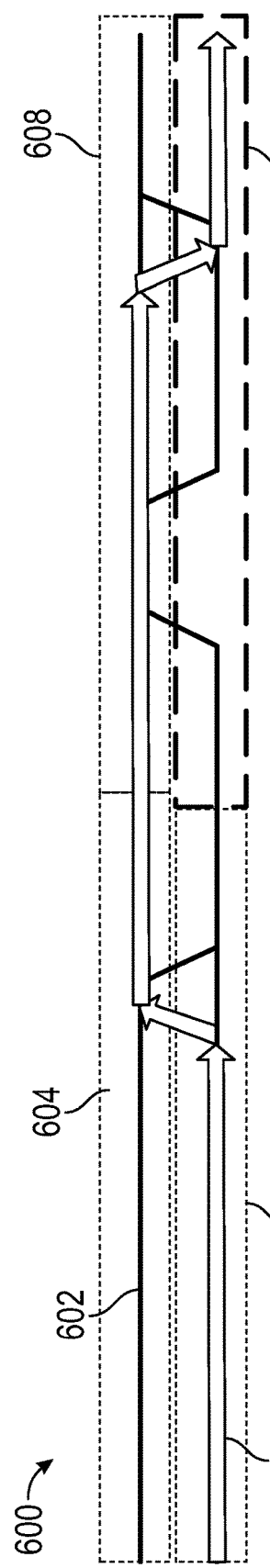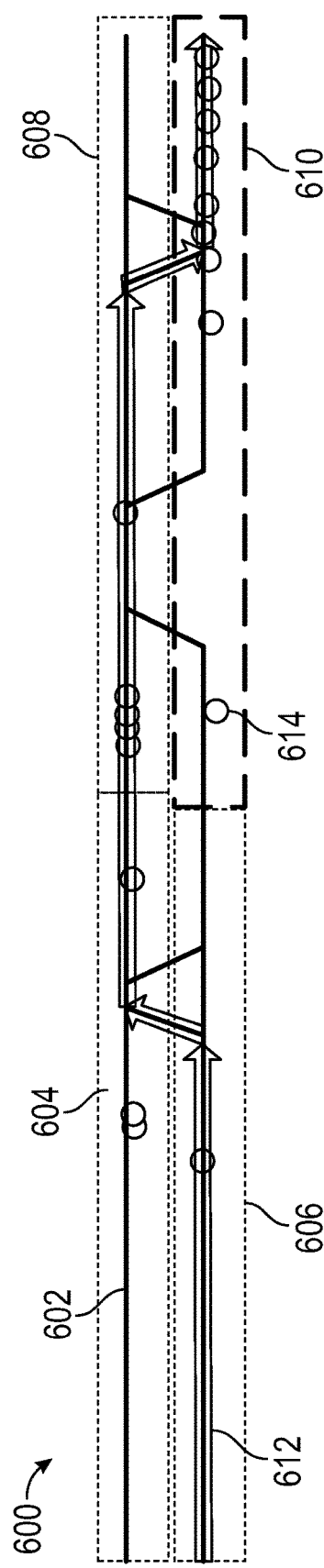

SYSTEM AND METHOD OF RAILROAD TRACK DATA AGGREGATION AND ANALYSIS FOR DETERMINING INSPECTION FREQUENCY

CROSS-REFERENCE TO RELATED APPLICATIONS

The present application is a Continuation of U.S. patent application Ser. No. 17/721,287, filed Apr. 14, 2022, the entirety of which is hereby incorporated by reference for all purposes.

TECHNICAL FIELD

The present disclosure relates generally to the management of railroad asset inspections, particularly systems and methods for railroad track data aggregation and analysis for determining inspection frequency by optimizing visual railroad inspection frequency based on acquired railroad track-related data.

BACKGROUND

Manual inspection of railroad assets can be a time consuming and inefficient process. Railroad tracks have dozens of components requiring inspection and inspectors have limited time. A given railroad in the United States might have 10,000 miles or more of railroad track across multiple states and various terrains. With such expansive work products across the United States, the inspectors might miss hazardous assets, which risk locomotive delays, increased wear on the railroad asset, or derailment.

Current methods of railroad asset inspections are based heavily on a recurrent method of assigning a particular inspection frequency to the railroad assets. The current methods apply a best-guess method for inspection frequency to all the railroad assets regardless of any unique conditions of the railroad asset or the environment. A proper inspection can require the close examination and documentation of many components and conditions. And if one component or condition is missed or mischaracterized, safety can become an issue.

The current methods overgeneralize the inspection process by applying the same process to each type of railroad asset. The reality of the inspection process is that good track might require fewer inspections than track in suboptimal conditions. The track in suboptimal conditions could be exposed to more extreme rainfall, more locomotives passing over, or be prone to fouling of the ballast. A railroad asset inspection method could benefit from a more focused process to pinpoint where the railroad track requires maintenance based on data of the conditions affecting the railroad track.

SUMMARY

The present disclosure achieves technical advantages as a system and method for minimizing safety hazards along a railroad track by optimizing visual railroad inspection frequency based on acquired data relating to railroad safety maintenance. The system and method can provide various rating systems for the particular railroad assets to optimize railroad inspections by focusing the inspections to railroad assets experiencing suboptimal conditions. The ratings of the railroad assets are based on various data collected from physical factors impacting the life of the railroad assets, such as an amount of rainfall, locomotive weight and frequency of passing, and manually detected defects. The system and method can focus the railroad inspection efforts to the railroad assets requiring increased attention in response to the suboptimal conditions. The focused inspections can result in longer lifespan of the railroad assets, efficient inspections, and safer railroads.

Accordingly, the present disclosure discloses concepts inextricably tied to computer technology such that the present disclosure provides the technological benefit of optimizing railroad asset inspections through data analysis techniques using acquired data from multiple sources of physical data and a network architecture optimum for accessing and retrieving data from databases. The system can provide the inspectors with a system configured to generate ratings of the railroad assets, focus inspection efforts, and prolong railroad asset lifespans to enhance safety. The present disclosure goes beyond mere manual inspection of the railroad assets generally assigning a frequency for railroad asset inspection, incorporating data analysis techniques to proactively identify and anticipate railroad asset failure based on measured physical factors. The system can generate inspection frequencies for the railroad assets to optimize efficiency of the inspections, avoiding the typical generalized inspection methods or predictive approaches. This also provides the benefit of providing an accurate understanding of the current states of the railway asset simplifying the inspection process by providing relevant information needed for a particular railroad asset, so the inspector can inspect the assets quickly, clearly, and efficiently, without inefficient duplicative work.

The present disclosure provides a technological solution missing from conventional systems by at least aggregating disparate data and analyzing the disparate data to generate a rating system based on data analysis techniques of measured physical factors impacting the railway to proactively assign an inspection frequency to a railroad asset. Moreover, the present disclosure incorporates various factors to generate the tiered rating for the inspection frequency. Generating the inspection frequency can be based on physical environmental characteristics of the railroad asset, the frequency and weight of locomotives passing overtop the asset, and ballast characteristics. The traditional approach lacks any implementation of measured physical factors affecting the railroad asset to assess an inspection frequency. The traditional systems simply rely on mathematical modeling of predicted defect formation or manual inspection of all assets, which can result in inefficient inspector effort potentially including errors resulting in a hazardous environments. In this manner, the traditional approach is lacking a subjective approach to railroad asset inspection. The present disclosure avoids adding strain on an already overspent system. The system and methods of the present disclosure can also provide at least the following functionality:

Generating tiered ratings for railroad asset inspection frequencies based on measured data of physical factors;
Providing an efficient railroad asset inspection method for enhanced railroad safety;
Generating an analysis of the railroad asset based on measured characteristics of the railroad asset; and
Providing a method compliant with relevant regulations for railroad travel and safety.

Further, a visual inspection model solves the problem of combining several factors for assessing track inspection requirements such that it refreshes and updates with data for inspectors to use to inspect track at a desired frequency. A system according to the present disclosure can receive data from a geometry car, track predetermined features, traffic characteristics, manual defects, and combine them over individual track segments to generate a value for assessing frequency of visual track inspections. Variables can account for track conditions based on values and inputs. The variables can be leading indicators for concerns with track conditions. A Visual Inspection Model can change with track segment conditions and can be adaptive to received data, such that it is "data driven." Segment escalation for increase visual inspections if testing invalid or not tested. The system can treat all input variables as categorical quantities, such as CSP, GeoTag, and ClassDrop inputs.

Advantageously, the system transforms the received inputs, such as BFI, MGT, and Rainfall by converting the inputs from continuous variables to whole-integer values and rescaling (e.g., normalizing) the values to match the categorical variables before contributing to the total score. An IF Model can be a scoring system that assigns specific section of track to one of three inspection protocols based on associated values for MGT, BFI, Rainfall, ClassDrop, CSP Category, Manual Defect, and CW Joint Count. The calculated score (which can be a function of the individual score values calculated for each of the input variables) can be reclassed to one of the three inspection protocols. For the purpose of assessing model sensitivity to each of these input variables, the score can be calculated as a model result, rather than the associated inspection protocol. The IF Model can generate a single score for each input track. In a "full-factorial" design, every possible combination of input value would be used to generate a series of model results, and the result values can be plotted as functions of various inputs.

The general process can produce a fixed number of track records, holding one input variable at a fixed value, and allowing all others to be drawn from a random pool of values based on the empirical density function for that variable. Those records can be written to a text data file with a structure that resembles each of the weekly model reports. Those data files can then be used as input to an application that calculates various reporting metrics. The system can duplicate the calculation steps derived from weekly track inspection category reports. The system can also generate various statistics based on the weekly data records and can generate pseudo-random data records to satisfy the criteria associated with specific analytic scenarios, as well as the metrics used to assess model behavior.

It is an object of the invention to provide a system for minimizing safety hazards along a railroad track by optimizing visual railroad inspection frequency based on acquired data relating to railroad safety maintenance. It is a further object of the invention to provide a method for minimizing safety hazards along a railroad track by optimizing visual railroad inspection frequency based on acquired data relating to railroad safety maintenance. It is a further object of the invention to provide a computer-implemented method for minimizing safety hazards along a railroad track by optimizing visual railroad inspection frequency based on acquired data relating to railroad safety maintenance. These and other objects are provided by at least the following embodiments.

In one embodiment, a system for minimizing safety hazards along a railroad track by optimizing visual railroad inspection frequency based on acquired data relating to railroad safety maintenance, comprising: a memory for storing the acquired data relating to the railroad safety maintenance and an inspection frequency classification model to transform the acquired data from a raw form to a final inspection frequency value; and a processor that is configured to transform the acquired data relating to the railroad safety maintenance from the raw form to the final inspection frequency value, by performing the steps of: receiving the acquired data relating to railroad safety maintenance for at least one segment of railroad track; assigning a railroad safety value for each of a plurality of categories of the acquired data based on a user defined hazard model; aggregating the railroad safety values to generate a railroad safety score; when a metric gross ton (MGT) calculation includes a rail joint factor, multiplying the railroad safety score by a user defined multiplier; and generating the final inspection frequency value for the at least one segment of railroad track based on the railroad safety score. Wherein the processor is further configured to perform the step of segmenting the acquired data into the plurality of categories. Wherein the plurality of categories includes comprehensive service plan (CSP), MGT, precipitation, geometry car tag, ballast fouling index (BFI), slow order, and manual defects. Wherein the geometry car tag includes an open tag or a closed tag. Wherein the open tag and the closed tag each correspond to a first tag type, a second tag type, or a third tag type. Wherein the processor is further configured to perform the step of determining whether to increase an inspection frequency of the segment of railroad track when the segment of railroad track corresponds to a minimum inspection criteria threshold. Wherein the minimum inspection criteria threshold includes a measurement of at least 12 MGT across the segment of railroad track since a previous test. Wherein the inspection frequency increases to a next available railroad manual inspection frequency. Wherein the final inspection frequency value is based on user defined inspection thresholds including a first railroad manual inspection frequency, a second railroad manual inspection frequency, and a third railroad manual inspection frequency. Wherein the first railroad manual inspection frequency is two inspections per month, the second railroad manual inspection frequency is one inspection per week, and the third railroad manual inspection frequency is three inspections per week.

In another embodiment, a method for minimizing safety hazards along a railroad track by optimizing visual railroad inspection frequency based on acquired data relating to railroad safety maintenance, comprising: receiving the acquired data relating to railroad safety maintenance for at least one segment of railroad track; assigning a railroad safety value for each of a plurality of categories based on a user defined hazard model; aggregating the railroad safety values to generate a railroad safety score; when a metric gross ton (MGT) calculation includes a rail joint factor, multiplying the railroad safety score by a user defined multiplier; and generating the final inspection frequency value for the at least one segment of railroad track based on the railroad safety score. Wherein the processor is further configured to perform the step of segmenting the acquired data into the plurality of categories. Wherein the plurality of categories includes comprehensive service plan (CSP), MGT, precipitation, geometry car tag, ballast fouling index (BFI), slow order, and manual defects. Wherein the geometry car tag includes an open tag or a closed tag. Wherein the open tag and the closed tag each correspond to a first tag type, a second tag type, or a third tag type. Wherein the processor is further configured to perform the step of determining whether to increase an inspection frequency of the segment of railroad track when the segment of railroad track corresponds to a minimum inspection criteria threshold. Wherein the minimum inspection criteria threshold includes a measurement of at least 12 MGT across the segment of railroad track since a previous test. Wherein the inspection frequency increases to a next available railroad manual inspection frequency. Wherein the final inspection frequency value is based on user defined inspection thresholds including a first railroad manual inspection frequency, a second railroad manual inspection frequency, and a third railroad manual inspection frequency. Wherein the first railroad manual inspection frequency is two inspections per month, the second railroad manual inspection frequency is one inspection per week, and the third railroad manual inspection frequency is three inspections per week.

In another embodiment, a computer-implemented method for minimizing safety hazards along a railroad track by optimizing visual railroad inspection frequency based on acquired data relating to railroad safety maintenance, the computer-implemented method comprising: receiving the acquired data relating to railroad safety maintenance for at least one segment of railroad track; assigning a railroad safety value for each of a plurality of categories based on a user defined hazard model; aggregating the railroad safety values to generate a railroad safety score; when a metric gross ton (MGT) calculation includes a rail joint factor, multiplying the railroad safety score by a user defined multiplier; and generating the final inspection frequency value for the at least one segment of railroad track based on the railroad safety score. Wherein the processor is further configured to perform the step of segmenting the acquired data into the plurality of categories. Wherein the plurality of categories includes comprehensive service plan (CSP), MGT, precipitation, geometry car tag, ballast fouling index (BFI), slow order, and manual defects. Wherein the geometry car tag includes an open tag or a closed tag. Wherein the open tag and the closed tag each correspond to a first tag type, a second tag type, or a third tag type. Wherein the processor is further configured to perform the step of determining whether to increase an inspection frequency of the segment of railroad track when the segment of railroad track corresponds to a minimum inspection criteria threshold. Wherein the minimum inspection criteria threshold includes a measurement of at least 12 MGT across the segment of railroad track since a previous test. Wherein the inspection frequency increases to a next available railroad manual inspection frequency. Wherein the final inspection frequency value is based on user defined inspection thresholds including a first railroad manual inspection frequency, a second railroad manual inspection frequency, and a third railroad manual inspection frequency. Wherein the first railroad manual inspection frequency is two inspections per month, the second railroad manual inspection frequency is one inspection per week, and the third railroad manual inspection frequency is three inspections per week.

In another embodiment, a method for assessing frequency of visual track inspections, can include: receiving data related to a railroad track segment; generating continuous variables and categorical variables representing track segment condition indicators of concern; converting and rescale continuous variables to match categorical variables; generating an inspection value for each of the variables; and generating a model that assigns a specific section of track to one of a plurality of inspection protocols based on the inspection values. Further comprising generating a series of model results for every combination of input value. Further comprising holding a first variable at a fixed value and allowing all other variables to be drawn from a random pool of values based on the empirical density function for that variable. Wherein the model can escalate a track segment for increased visual inspections if testing invalid or not tested. Wherein the inspection protocols can be three times a week, once a week, or twice per month. Wherein the inspection protocols can be based on associated values for MGT, BFI, Rainfall, ClassDrop, CSP Category, Manual Defect, and CW Joint Count.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

FIGS. 6A-6C illustrate exemplary diagrams for a railroad inspection system, in accordance with one or more exemplary embodiments of the present disclosure.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. Pursuant to MPEP § 904, the Examiner, after having obtained a thorough understanding of the invention disclosed and claimed in the nonprovisional application has searched the prior art as disclosed in patents and other published documents, i.e., nonpatent literature. Therefore, as evidenced by the issuance of this patent, the prior art fails to disclose or teach the elements and limitations presented in the claims as enabled by the specification and drawings, such that the presented claims are patentable under 35 U.S.C. §§ 101, 102, 103, and 112.

Figure 1A:
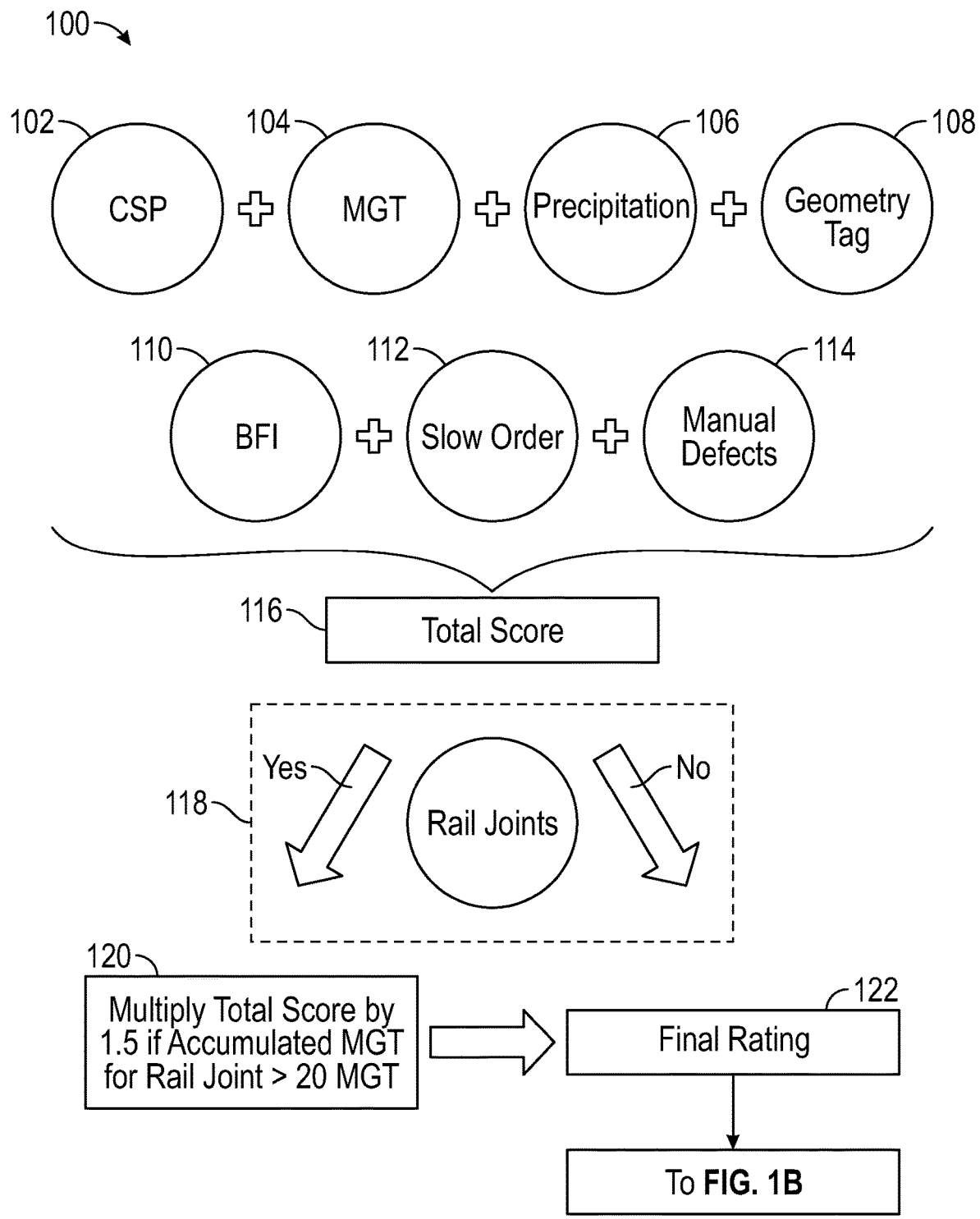
FIGS. 1A and 1B illustrate a data flow diagram of a railroad asset inspection system, in accordance with one or more exemplary embodiments of the present disclosure.
Figure 1B:
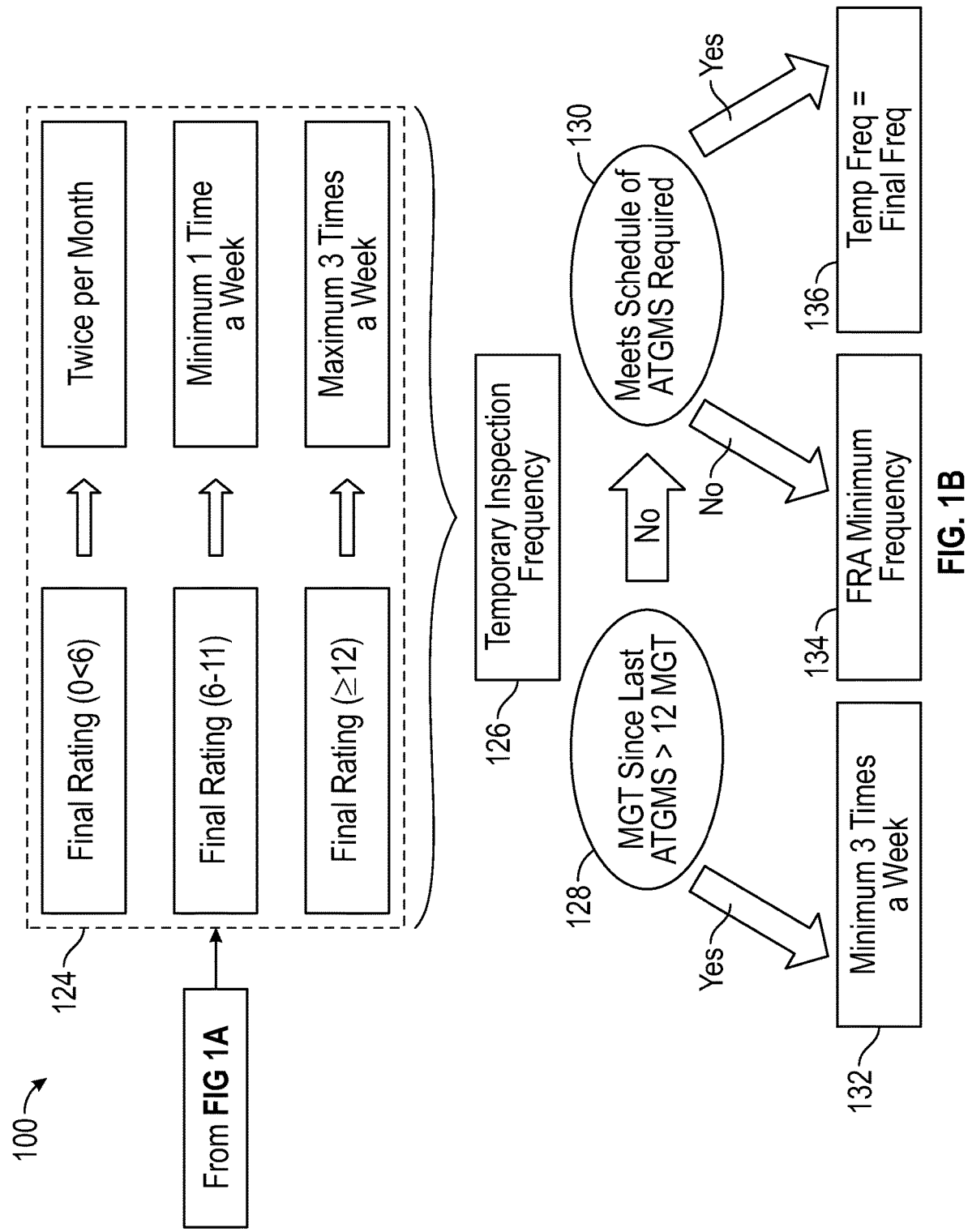

FIGS. 1A and 1B illustrate a data flow diagram of a railroad asset inspection system 100, in accordance with one or more exemplary embodiments of the present disclosure. The railroad asset inspection system 100 can include comprehensive service plan (CSP) data 102, million gross tons (MGT) data 104, precipitation data 106, geometry tag data 108, ballast fouling index (BFI) data 110, slow order data 112, manual defect data 114, a total score 116, a rail joint decision point 118, a multiplier 120, a final rating 122, a final rating transformation 124, a temporary inspection frequency 126, an MGT decision point 128, a scheduling decision point 130, an elevated inspection frequency 132, a Federal Railroad Administration (FRA) minimum inspection frequency 134, and a final inspection frequency 136.

The aforementioned system steps can be instantiated in hardware, software, or a suitable combination of hardware and software therefor, and may comprise one or more software systems operating on one or more servers, having one or more processors, with access to memory. The servers can include electronic storage, one or more processors, and/or other components. The servers can include communication lines, connections, and/or ports to enable the exchange of information via a network and/or other computing platforms. The servers can also include a plurality of hardware, software, and/or firmware components operating together to provide the functionality attributed herein to the servers. For example, the servers can be implemented by a cloud of computing platforms operating together as a server, including SaaS, IaaS, and PaaS functionality. Additionally, the servers can include the memory.

The structural components of the steps can be communicably coupled to each other via a network (e.g., network 340 in FIG. 3), such that data can be transmitted. The network can be the Internet, intranet, or other suitable network. The data transmission can be encrypted, unencrypted, over a VPN tunnel, or other suitable communication means. The network can be a WAN, LAN, PAN, or other suitable network type. The network communication between the system components can be encrypted using PGP, Blowfish, Twofish, 3DES, HTTPS, or other suitable encryption. The system 100 can be configured to provide communication via the various systems, components, and modules disclosed herein via an API, PCI, PCI-Express, ANSI-X12, Ethernet, Wi-Fi, Bluetooth, or other suitable communication protocol or medium. Additionally, third party systems and databases can be operably coupled to the system components via the network.

The data transmitted to and from the components of system 100, can include any format, including JSON, TCP/IP, XML, HTML, ASCII, SMS, CSV, REST, or other suitable format. The data transmission can include a message, flag, header, header properties, metadata, and/or a body, or be encapsulated and packetized by any suitable format having same.

The CSP data 102, in an embodiment, can include information about the CSP. The CSP information can include, in addition to work orders themselves, data from a geometry car used to segment the track sequentially into non-CSP (track with no measured values out of compliance) and CSP (track with at least one measured value out of compliance) sections. The track sections bounded at these CSP/non-CSP transitions compose the individual records for which inspection frequency classifications are calculated. CSP sections of track increment a CSP data value by 1, 2, or 3 depending on the degree to which the measured values deviate from the acceptable range.

The MGT data 104, in an embodiment, can include information about the MGT across the segment of track. The MGT information can include data corresponding to specific requirements for certain classes of track set by the FRA. Not only is the MGT aggregated during the previous calendar year a decision criterion, but the maximum allowed aggregated MGT between inspections is also regulated for certain track. Depending on the specific kind of track involved, MGT categories used by the FRA for various regulations are bounded by these values: 2, 10, 20, 40, and 60. In an example, system 100 can recode the MGT calculated for each track section according to this table.

| MGT | Coded score |
| --- | --- |
| <40 | 1 |
| 40-80 | 2 |
| >80 | 3 |

The MGT values for the pilot track are always non-zero, ranging from 0.018 to 191.942.

The precipitation data 106, in an embodiment, can include information about the precipitation across the segment of track. The precipitation information can include data corresponding to wet precipitation aggregated during the previous week is tabulated. Frost, ice, aggregated snow, and snowmelt are not included in the IF Model. The actual data are provided as part of an AccuWeather subscription service.

| Rainfall | Coded score |
| --- | --- |
| 0" (or trace amount) | 0 |
| 0"-1" | 1 |
| 1"-2" | 2 |
| >2" | 3 |

The geometry tag data 108, in an embodiment, can include information about the defects corresponding to the segment of track. The geometry tag information can include rail gauge, deflection under load, and other measurements are taken by instruments carried by a special car that runs over all track on a regular basis. The results of these geometry car runs are used to generate work orders of various kinds. The work orders are color-coded to indicate defect severity and are used directly for scoring as shown below.

| Yellow Tag | Orange Tag | Red Tag | Coded score |
| --- | --- | --- | --- |
| 0 | 0 | 0 | 0 |
| 1+ | N/A | N/A | 1 |
| N/A | 1+ | N/A | 2 |
| N/A | N/A | 1+ | 3 |

The BFI data 110, in an embodiment, can include information about the ballast for segment of track. The BFI information can include the amount of fine particulate matter lodged within the gaps between larger rock and gravel composing the ballast, or railbed, is associated with loss of the ability of the ballast to support load without shifting to a dangerous degree. An index of the degree to which ballast has been "fouled" is provided by railcars with ground-penetrating radar instrumentation. Observed values range from near zero to 200. Track is typically scanned twice a year, in 15' sections. As a rule of thumb, track inspectors would typically flag sections of track having a BFI of 55 or above as defective based on visual cues alone.

| BFI | Coded score |
| --- | --- |
| <20 | 1 |
| 20-29 | 2 |
| 30-39 | 3 |
| >40 | 4 |

The slow order data 112, in an embodiment, can include information about a speed restriction across the segment of track. The slow order information can include a reduction in maximum allowed speed for freight and/or passenger train runs is an administrative action which often indicates that a defect of some kind has been observed or modifications to a track are in progress or have taken place. Almost all speed reductions will result in a reduction in the FRA Class rating for the affected track. The change in freight track Class number is used directly for scoring as follows.

| Class Drop | Coded score |
| --- | --- |
| No Slow Order | 0 |
| No Change in Class | 1 |
| Class Drop by 1 | 2 |
| Class Drop by 2 | 3 |

The manual defect data 114, in an embodiment, can include information about defects identified manually. The manual defect information can include when rail and/or railbed defects are observed while performing other tasks, inspectors and staff can record the specific defect in a work order database. For a defined group of defects, the Inspection Frequency Score is automatically raised to the maximum value (5).

The total score 116, in an embodiment, can include an aggregated value corresponding to the above-described data values. The total score 116 can have a maximum of 48.5.

The rail joint decision point 118, in an embodiment, can include information corresponding to whether the segment of track includes a rail joint. The rail joint information can include data corresponding to whether the load-bearing strength of individual sections of rail is reduced at points where the rail is interrupted, particularly at places where repairs to the rail or bed have taken place. It is common for these temporary joints to persist for a short time after repair activities, but normally they are replaced by welded joints. In an example, the total score 116 can be multiplied the multiplier 120.

The multiplier 120, in an embodiment, can multiply the total score 116 by 1.5 if an aggregated MGT is over a user defined threshold for a rail joint. For example, the user defined threshold can be 20 MGT.

The final rating 122, in an embodiment, can include the aggregated score for the above factors. For example, the above factors can add up to a score associated with various visual inspection frequencies.

The final rating transformation 124, in an embodiment, can include a conditional transformation of the final rating 122 to a visual inspection frequency. For example, when the final rating 122 is between 0 and 6, the visual inspection frequency is twice per month. In another example, when the final rating 122 is between 6 and 11, the visual inspection frequency is one time per week. In another example, when the final rating 122 is greater than or equal to 12, the visual inspection frequency is three times per week.

The temporary inspection frequency 126, in an embodiment, can include the visual inspection frequency from the final rating transformation 124. For example, the temporary inspection frequency 126 can include the visual inspection frequency as twice per month, one time per week, or three times per week.

The MGT decision point 128, in an embodiment, can include a determination of whether the segment of track withstood a weight on the track greater than a MGT threshold. For example, the MGT threshold can include 12 MGT. If the segment of track withstood a weight greater than the MGT threshold, the visual inspection frequency is elevated. If the segment of track withstood a weight less than the MGT threshold, the system 100 determines whether the scheduling meets a requirement standard.

The scheduling decision point 130, in an embodiment, can include a determination of whether the scheduling meets a requirement standard. For example, the requirement standard can include an ATGMS requirement. If the segment of track is scheduled for greater than the requirement standard, the visual inspection frequency is the FRA minimum inspection frequency 134. If the segment of track is scheduled for less than the requirement standard, the temporary inspection frequency 126 is the final inspection frequency 136.

The elevated inspection frequency 132, in an embodiment, can include an increase in the visual inspection frequency. For example, the increase in the visual inspection frequency can increase to a next inspection frequency. In an example, the visual inspection frequency can increase from twice per month to one time per week. In another example, the visual inspection frequency can increase from one time per week to three times per week. In another example, the visual inspection frequency can remain at three times per week.

The FRA minimum inspection frequency 134, in an embodiment, can include a minimum visual inspection frequency allowable by legal regulation. For example, the FRA can establish the minimum inspection frequency by law to twice per month, one time per week, three times per week, or some other minimum visual inspection frequency.

The final inspection frequency 136, in an embodiment, can include the visual inspection frequency an inspector will apply to the segment of track. For example, when the final inspection frequency 136 is twice per month, the inspector will visit the segment of track twice per month to inspect for any hazardous situations, defects, or potential issues.

Figure 2A:
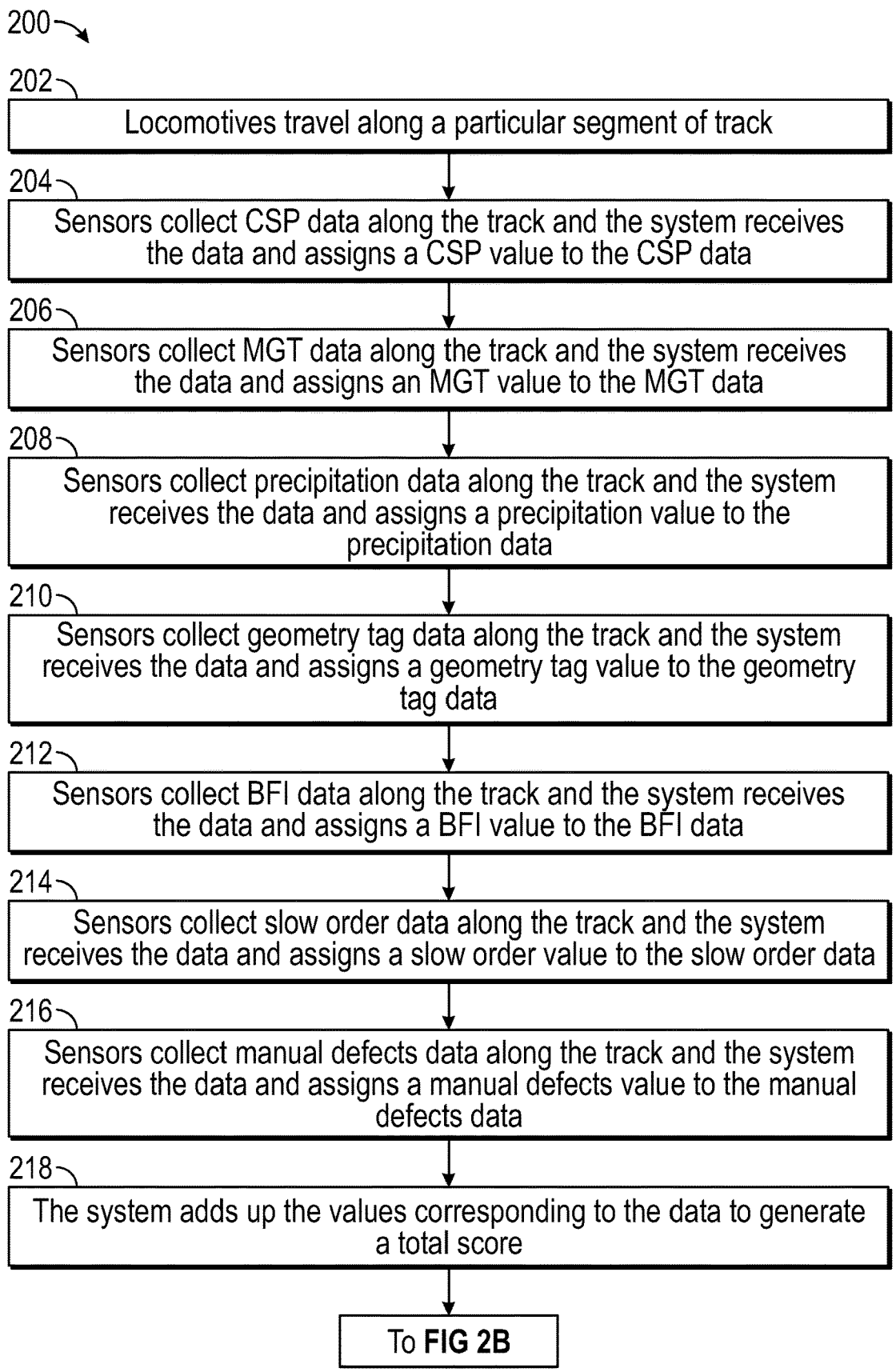
FIGS. 2A and 2B illustrate a flowchart of a process for railroad asset inspection, in accordance with one or more exemplary embodiments of the present disclosure.
Figure 2B:
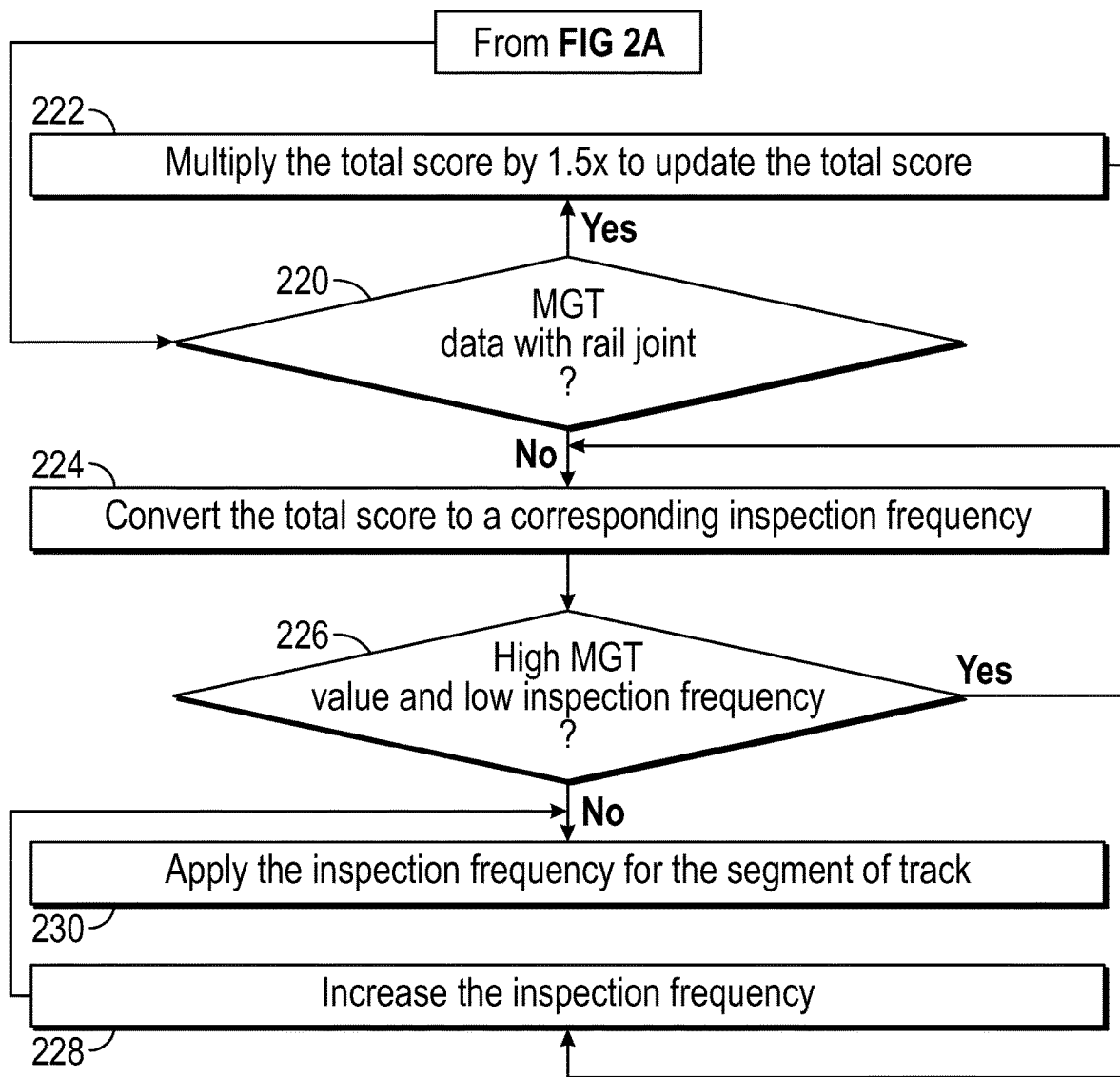

FIGS. 2A and 2B illustrates a flowchart of a process for railroad asset inspection 200, in accordance with one or more exemplary embodiments of the present disclosure. The process for railroad asset inspection 200 can be implemented as algorithm(s) on a computer processor (e.g., vital logic controller, onboard computer, server), a machine learning module, or other suitable system. Additionally, the process for railroad asset inspection 200 can be achieved with software, firmware, hardware, an application programming interface (API), a network connection, a network transfer protocol, HTML, DHTML, JavaScript, Dojo, Ruby, Rails, other suitable applications, or a suitable combination thereof. The process for railroad asset inspection 200 can be implemented in a computer environment (e.g., physical computer processor, virtual machine) can be capable of transforming acquired data relating to the railroad safety maintenance from a raw form to a final inspection frequency value and operably coupled to a memory storing the acquired data relating to the railroad safety maintenance and an inspection frequency classification model to transform the acquired data from a raw form to a final inspection frequency value.

The process for railroad asset inspection 200 can leverage the ability of a computer platform to spawn multiple processes and threads by processing data simultaneously. The speed and efficiency of the process for railroad asset inspection 200 can be greatly improved by instantiating more than one process for managing dual westbound trains. However, one skilled in the art of programming will appreciate that use of a single processing thread may also be utilized and is within the scope of the present disclosure. The process for railroad asset inspection 200 can also be distributed amongst a plurality of networked computer processors. The computer processors can be located in servers (e.g., 302 in FIG. 3). The process for railroad asset inspection 200 of the present embodiment begins at step 202.

At step 202, in an embodiment, the process 200 can include locomotives travelling along a segment of track. For example, the locomotives can include passenger locomotives, cargo locomotives, geometry tag cars, or any other type of locomotive traveling along the segment of track. In an example, the locomotive is used to gather data corresponding to physical characteristics of the segment of track. For example, when the locomotive is a geometry tag car, the locomotive can identify defects along the segment of track and assign a tag to the defect. In another example, the locomotive can carry a payload for transport across the segment of track. The process 200 then proceeds to step 204.

At step 204, in an embodiment, the process 200 can instruct hardware components to collect CSP data using external sensors along the track and the system 200 can receive the data and assign a CSP value to the CSP data. The process 200 can store and access the CSP data in an external database corresponding to a network architecture optimum for data access and retrieval. For example, the external database can correspond to a permanent database for storage of all railway information. Alternatively, the external database can correspond to a temporary database for temporary storage of the railway data for rapid access. The CSP data can include, in addition to work orders themselves, data from a geometry car used to segment the track sequentially into non-CSP (track with no measured values out of compliance) and CSP (track with at least one measured value out of compliance) sections. The track sections bounded at these CSP/non-CSP transitions compose the individual records for which inspection frequency classifications are calculated. The process 200 then proceeds to step 206.

At step 206, in an embodiment, the process 200 can instruct hardware components to collect MGT data using external sensors along the track and the system 200 can receive the data and assign an MGT value to the MGT data. The process 200 can store and access the MGT data in the external database corresponding to the network architecture optimum for data access and retrieval. For example, the external database can correspond to a permanent database for storage of all railway information. Alternatively, the external database can correspond to a temporary database for temporary storage of the railway data for rapid access. The process 200 can collect the MGT data using external sensors corresponding to the segment of track measuring the MGT. In another example, the process 200 can collect the MGT data using a record of locomotives passing across the segment of track. The process 200 then proceeds to step 208.

At step 208, in an embodiment, the process 200 can instruct hardware components to collect precipitation data using external sensors along the track and the system 200 can receive the data and assign a precipitation value to the precipitation data. For example, the precipitation data can include information about the precipitation across the segment of track. The process 200 can store and access the precipitation data in the external database corresponding to the network architecture optimum for data access and retrieval. For example, the external database can correspond to a permanent database for storage of all railway information. Alternatively, the external database can correspond to a temporary database for temporary storage of the railway data for rapid access. The process 200 then proceeds to step 210.

At step 210, in an embodiment, the process 200 can instruct hardware components to collect geometry tag data using external sensors corresponding to the segment of track and the system 200 can receive the data and assign a geometry tag value to the geometry tag data. The geometry tag data can include information about the defects corresponding to the segment of track. The process 200 can store and access the geometry tag data in the external database corresponding to the network architecture optimum for data access and retrieval. For example, the external database can correspond to a permanent database for storage of all railway information. Alternatively, the external database can correspond to a temporary database for temporary storage of the railway data for rapid access. The process 200 then proceeds to step 212.

At step 212, in an embodiment, the process 200 can instruct hardware components to collect BFI data using external sensors along the track and the system 200 can receive the data and assign a BFI value to the BFI data. For example, the BFI data can include information about the ballast for segment of track. The process 200 can store and access the BFI data in the external database corresponding to the network architecture optimum for data access and retrieval. For example, the external database can correspond to a permanent database for storage of all railway information. Alternatively, the external database can correspond to a temporary database for temporary storage of the railway data for rapid access. The process 200 then proceeds to step 214.

At step 214, in an embodiment, the process 200 can instruct hardware components to collect slow order data using external sensors along the track and the system 200 can receive the data and assign a slow order value to the slow order data. The slow order data can include information about a speed restriction across the segment of track. The process 200 can store and access the slow order data in the external database corresponding to the network architecture optimum for data access and retrieval. For example, the external database can correspond to a permanent database for storage of all railway information. Alternatively, the external database can correspond to a temporary database for temporary storage of the railway data for rapid access. The process 200 then proceeds to step 216.

At step 216, in an embodiment, the process 200 can instruct hardware components to collect manual defect data using external sensors along the track and the system 200 can receive the data and assign a manual defect value to the manual defect data. For example, the manual defect data can include information about defects identified manually. The process 200 can store and access the slow order data in the external database corresponding to the network architecture optimum for data access and retrieval. For example, the external database can correspond to a permanent database for storage of all railway information. Alternatively, the external database can correspond to a temporary database for temporary storage of the railway data for rapid access. The process 200 then proceeds to step 218.

At step 218, in an embodiment, the process 200 can instruct hardware components to add the above values corresponding to the railway safety data to generate a total score. The process 200 then proceeds to step 220.

At step 220, in an embodiment, the process 200 can determine whether the MGT data for the segment of track includes information indicating the existence of a rail joint along the segment of track. For example, the process 200 can parse the MGT data to identify digital variables corresponding to whether MGT data include the information corresponding to existence of the rail joint for the segment of track. In an example, the MGT data can include a variable indicating the existence of the rail joint along the segment of track using a binary value. For example, a "0" can indicate the segment of track lacks any rail joint. Alternatively, a "1" can indicate the segment of track includes at least one rail joint. If the MGT data includes information about a rail joint, the process 200 then proceeds to step 222. If the MGT data does not include information about a rail joint, the process 200 then proceeds to step 224.

At step 222, in an embodiment, the process 200 can instruct hardware components to multiply the total score by a user defined multiplier. For example, the user defined multiplier can be 1.5. The process 200 then proceeds to step 224.

At step 224, in an embodiment, the process 200 can instruct hardware components to convert the total score to a corresponding inspection frequency. The process 200 then proceeds to step 226.

At step 226, in an embodiment, the process 200 can determine whether the MGT value is greater than an expected MGT value and the inspection frequency is below an expected frequency value. If the segment of track registers the MGT value greater than the expected MGT value and an inspection frequency lower than the expected frequency value, the process 200 then proceeds to step 228. If the segment of track registers the MGT value less than the expected MGT value or an inspection frequency greater than the expected frequency value, the process 200 then proceeds to step 230.

At step 228, in an embodiment, the process 200 can increase the inspection frequency. The process 200 then proceeds to step 230.

At step 230, in an embodiment, the process 200 can apply the inspection frequency for the segment of track. The process 200 then terminates or awaits a new inspection creation request and can repeat the aforementioned steps.

Figure 3:
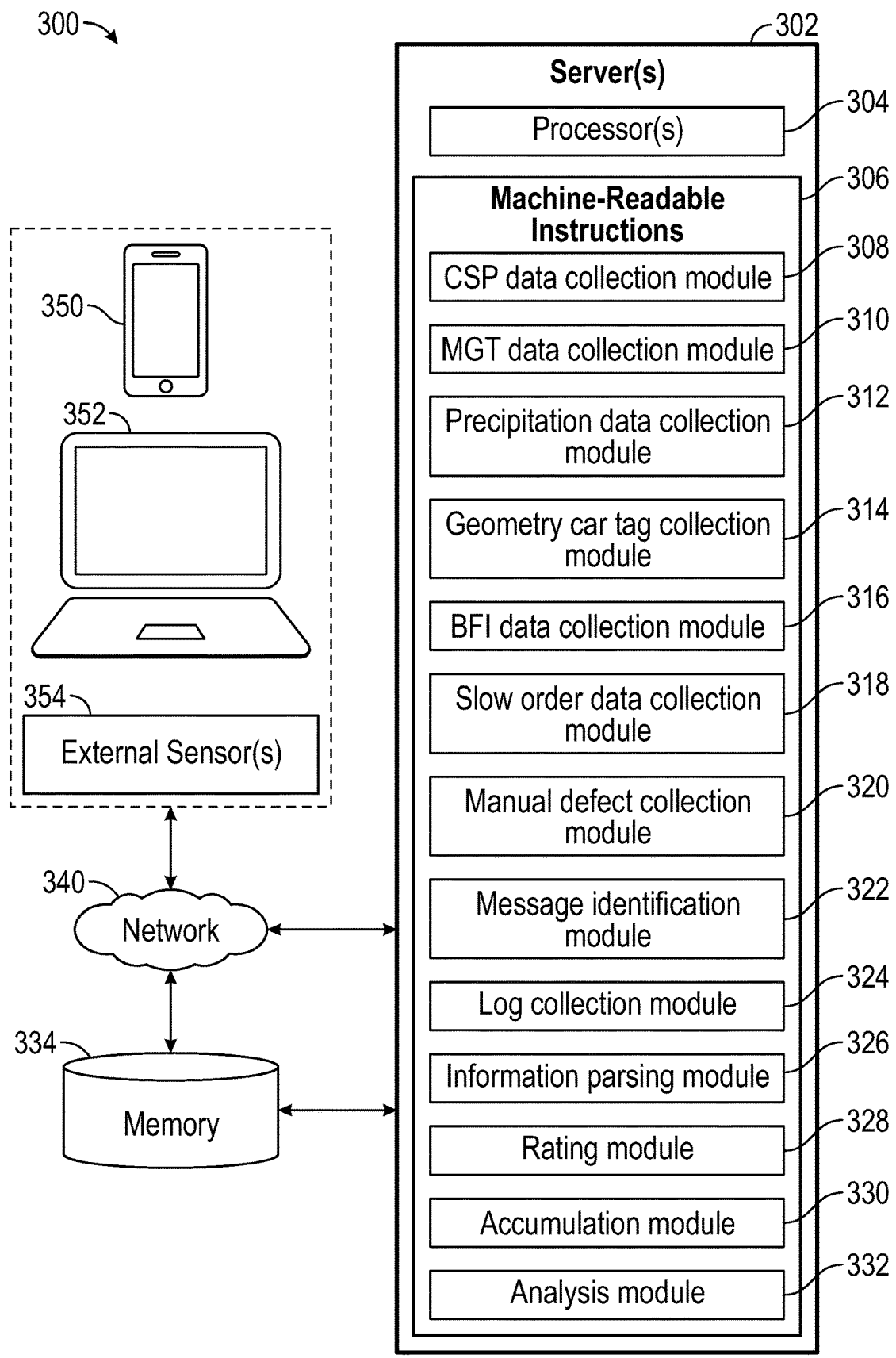
FIG. 3 illustrates a schematic view of a railroad asset maintenance system, in accordance with one or more exemplary embodiments of the present disclosure.

FIG. 3 illustrates a schematic view of a railroad asset maintenance system 300, in accordance with one or more exemplary embodiments of the present disclosure. The system 300 can include one or more servers 102 having one or more processor(s) 104, a memory 130, machine-readable instructions 106, including a CSP data collection module 308, MGT data collection module 310, precipitation data collection module 312, geometry car tag collection module 314, BFI data collection module 316, slow order data collection module 318, manual defect collection module 320, message identification module 322, log collection module 324, information parsing module 326, rating module 328, accumulation module 330, analysis module 332, among other relevant modules. The server 102 can be operably coupled to one or more clients via a network 140. The client can be a mobile communication device 150, a personal laptop 352, external sensors 354, or another type of hardware or software for communicating data over the network 340. In another exemplary embodiment, the mobile communication device 150, the personal laptop 352, or external sensors 354 can include an application configured to communicate with the server 102 over the network 140.

The aforementioned system components (e.g., server(s) 102 and clients 350, 352, 354) can be communicably coupled to each other via the network 140, such that data can be transmitted. The network 140 can be the Internet, intranet, or other suitable network. The data transmission can be encrypted, unencrypted, over a VPN tunnel, or other suitable communication means. The network 140 can be a WAN, LAN, PAN, or other suitable network type. The network communication between the clients, server 302, or any other system component can be encrypted using PGP, Blowfish, Twofish, AES, 3DES, HTTPS, or other suitable encryption. The system 100 can be configured to provide communication via the various systems, components, and modules disclosed herein via an application programming interface (API), PCI, PCI-Express, ANSI-X12, Ethernet, Wi-Fi, Bluetooth, or other suitable communication protocol or medium. Additionally, third party systems and databases can be operably coupled to the system components via the network 140.

The data transmitted to and from the components of system 300 (e.g., the server 302 and clients 350, 352, 354), can include any format, including JavaScript Object Notation (JSON), TCP/IP, XML, HTML, ASCII, SMS, CSV, representational state transfer (REST), or other suitable format. The data transmission can include a message, flag, header, header properties, metadata, and/or a body, or be encapsulated and packetized by any suitable format having same.

The server(s) 102 can be implemented in hardware, software, or a suitable combination of hardware and software therefor, and may comprise one or more software systems operating on one or more servers, having one or more processor(s) 104, with access to memory 130. Server(s) 102 can include electronic storage, one or more processors, and/or other components. Server(s) 102 can include communication lines, connections, and/or ports to enable the exchange of information via a network (e.g., the network 140) and/or other computing platforms. Server(s) 102 can also include a plurality of hardware, software, and/or firmware components operating together to provide the functionality attributed herein to server(s) 102. For example, server(s) 102 can be implemented by a cloud of computing platforms operating together as server(s) 102, including Software-as-a-Service (SaaS) and Platform-as-a-Service (PaaS) functionality. Additionally, the server(s) 102 can include memory 130.

Memory 130 can comprise electronic storage that can include non-transitory storage media that electronically stores information. The electronic storage media of electronic storage can include one or both of system storage that can be provided integrally (e.g., substantially non-removable) with server(s) 102 and/or removable storage that can be removably connectable to server(s) 102 via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). The electronic storage can include a database, or public or private distributed ledger (e.g., blockchain). Electronic storage can store machine-readable instructions 106, software algorithms, control logic, data generated by processor(s), data received from server(s), data received from computing platform(s), and/or other data that can enable server(s) to function as described herein. The electronic storage can also include third-party databases accessible via the network 140.

Processor(s) 104 can be configured to provide data processing capabilities in server(s) 102. As such, processor(s) 104 can include one or more of a digital processor, an analog processor, a digital circuit designed to process information, an analog circuit designed to process information, a state machine, and/or other mechanisms for electronically processing information, such as FPGAs or ASICs. The processor(s) 104 can be a single entity or include a plurality of processing units. These processing units can be physically located within the same device, or processor(s) 104 can represent processing functionality of a plurality of devices or software functionality operating alone, or in concert.

The processor(s) 104 can be configured to execute machine-readable instructions 106 or machine learning modules via software, hardware, firmware, some combination of software, hardware, and/or firmware, and/or other mechanisms for configuring processing capabilities on processor(s) 104. As used herein, the term "machine-readable instructions" can refer to any component or set of components that perform the functionality attributed to the machine-readable instructions component 106. This can include one or more physical processor(s) 104 during execution of processor-readable instructions, the processor-readable instructions, circuitry, hardware, storage media, or any other components.

The server(s) 102 can be configured with machine-readable instructions having one or more functional modules. The machine-readable instructions 106 can be implemented on one or more servers 102, having one or more processor(s) 104, with access to memory 130. The machine-readable instructions 106 can be a single networked node, or a machine cluster, which can include a distributed architecture of a plurality of networked nodes. The machine-readable instructions 106 can include control logic for implementing various functionality, as described in more detail below. The machine-readable instructions 106 can include certain functionality associated with the system 100. Additionally, the machine-readable instructions 106 can include a smart contract or multi-signature contract that can process, read, and write data to the database, distributed ledger, or blockchain.

Figure 4:
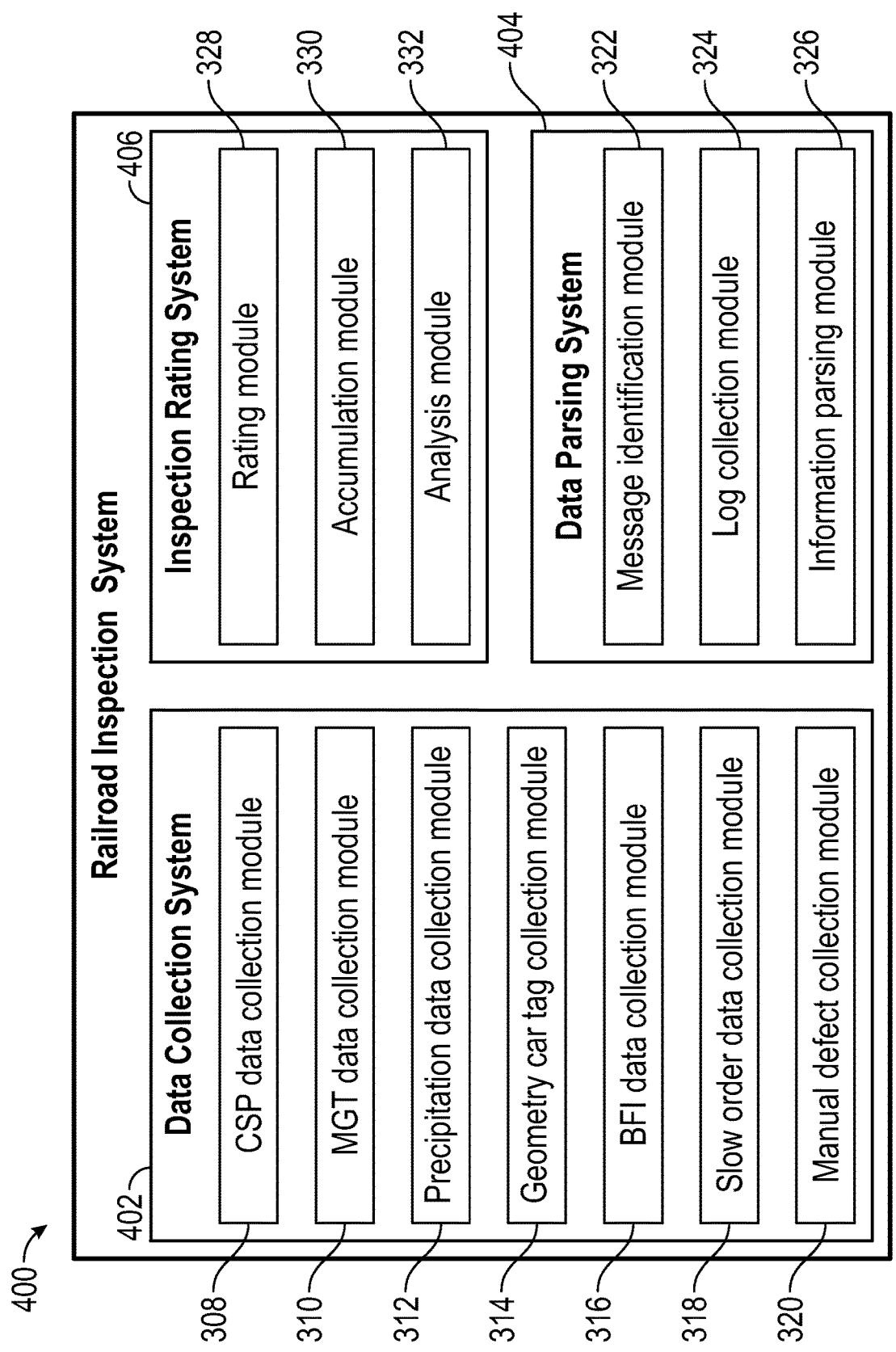
FIG. 4 illustrates a schematic view of a railroad inspection system, in accordance with one or more exemplary embodiments of the present disclosure.

FIG. 4 illustrate a schematic view of a railroad inspection system 400, in accordance with one or more exemplary embodiments of the present disclosure. The system 400 can include a data collection system 402, data parsing system 404, and inspection rating system 406. Although certain exemplary embodiments may be directed to rail assets, the system 400 can be used to plan maintenance for a type of railroad asset, including rails, ballasts, panels, ties, turnouts, facilities, or any suitable asset.

In one exemplary embodiment, the data collection system 402 can include a CSP data collection module 308, MGT data collection module 310, precipitation data collection module 312, geometry car tag collection module 314, BFI data collection module 316, slow order data collection module 318, and manual defect collection module 320. The CSP data collection module 308, MGT data collection module 310, precipitation data collection module 312, geometry car tag collection module 314, BFI data collection module 316, slow order data collection module 318, manual defect collection module 320 can implement one or more algorithms to connect to a network to communicate with a client, ultimately to facilitate railroad asset inspection and communicate data related to an inspection frequency for a segment of track. The algorithms and their associated thresholds and/or signatures can be programmable to suit a particular railroad asset, application, function, facility, or other requirement. The data collection system 402 can be configured to send and receive messages related to an inspection or other suitable activity, to and from the client or server. In another exemplary embodiment, the data collection system 402 can generate one or more elements for display on the user device. The elements can provide additional information to the user related to an inspection. For example, alerts can be generated by the data collection system 402 and displayed on the client to indicate data collection, data collection completion, data submission, data request, or other suitable information. Additionally, system symbols can be displayed on the client to indicate data collection status.

The CSP data collection module 308, in an embodiment, can collect the CSPs for the segments of track. For example, the CSP data collection module 308 can identify CSPs for the segments of track based on a service plan queue and store the CSPs in a tabular form in an external database. The external database can include an external memory, virtual machine implementation, or cloud environment, or any other environment suitable to queue the CSPs. In an example the location of the CSPs can be based on milepost measurements of the segment of track. In another example, the CSP data collection module 308 can remove any redundant information from the CSP data. For example, the data can include first CSP information across a first segment of track at a first time and second CSP information across a second segment of track at a second time. When the second segment of track is entirely included within the first segment of track, the CSP data collection module 308 can remove the second CSP information as redundant. In another example, when the second CSP information includes a segment of track entirely included within the first CSP information, the CSP data collection module 308 can skip the redundant information.

In another example, the CSP data collection module 308 can segment the CSP data into CSP segments and non-CSP segments. In this way, the CSP data collection module 308 can include CSP information on the entire segment of track, rather than part of the segment of track. For example, the CSP segments can include the CSP information corresponding to the segment of track, while the non-CSP segments can include a placeholder value. In an example, the non-CSP segments can correspond to lengths of the track without any CSP information. The CSP data collection module 308 can determine the lengths of the track without CSP information by identifying the positions of the segments of the track with CSP information and calculating a difference between the positions of the segments of the track. The CSP data collection module 308 can assign the difference between the positions as the non-CSP segments. In another example, the CSP data collection module 308 can assign the CSP data to each of a set of parallel tracks. For example, when the CSP data includes a single track segment for a parallel track segment, the CSP data collection module 308 assigns the CSP data to both of the parallel tracks. The CSP data collection module 308 can update the CSP data for both of the parallel tracks.

The MGT data collection module 310, in an embodiment, can collect the MGT data from a database. For example, the MGT data can include the MGT across a particular segment of track for a particular year. The MGT across the particular segment of track can include measurements from an external sensor active along the segment of track to measure the MGT as locomotives cross the location where the external sensor is measuring. In another example, the external sensor can update the database at a frequency usable for the particular application (i.e., in real-time, daily, weekly, etc.). In an example, the MGT data collection module 310 can access the database and search the database according to railway information. In an example, the railway information can include a particular year, a line segment of the track, a track type, a track number, and a center point of a mile post range. For example, an example search query can include the following input.

LS-05, Track Type-M, Track nbr-1, Begin MP-4.6463, End MP-4.7580. Where "LS-05" indicates a line segment identifier of 05, "Track Type-M" is a main track, "Track nbr-1" is an identifier for the particular track, "Begin MP-4.6463" identifies the mile post starting point at 4.6463, and "End MP-4.7580" identifies the mile post ending point at 4.7580.

In another example, the MGT data collection module 310 can collect the MGT data from the database on a monthly basis to calculate a latest MGT and a defect MGT. For example, the MGT data collection module 310 can calculate the latest MGT based on a daily MGT. The daily MGT can correspond to an calculated estimate on the daily tonnage across the segment of track based on the MGT data measured from the external sensor over a period of time. For example, the MGT data collection module 310 can query the database to collect the MGT data across the LS for one month (30 days). The MGT data collection module 310 can calculate the daily MGT by dividing the MGT data for the one month by the number of days. For example, the MGT data collection module can divide the MGT data by 30 days to calculate the daily MGT.

In an example, the latest MGT is calculated by multiplying the daily MGT by the difference between the current date and the last test date, as shown below.

Daily MGT calculated*no. of day (Current date–latest test date).

In another example, the defect MGT is calculated based on the daily MGT multiplied by the difference between the current date and the date of the first occurrence of a tag type. For example, the defect MGT can be calculated for a red tag as shown below.

Daily MGT calculated*no. of day (Current date–first occur red tag test date).

The precipitation data collection module 312, in an embodiment, can collect precipitation data from a database based on a location of the segment of track. For example, the database can include precipitation data from a particular timeframe. In an example, when the database lacks any precipitation data for the timeframe, the precipitation data collection module 312 can estimate the precipitation data based on precipitation data from another timeframe. For example, the precipitation data collection module 312 can compare a length of the timeframe with the other timeframe and calculate the average precipitation based on the precipitation data available from the other timeframe. In another example, the precipitation data collection module 312 can multiply the average precipitation from the other timeframe by a user defined precipitation multiplier to overestimate the amount of rainfall. In another example, the precipitation data collection module 312 can access a public weather data repository to collect public access weather data for the precipitation data.

The geometry car tag collection module 314, in an embodiment, can identify defects across the segment of track. For example, a geometry car will travel across the segment of track to identify any defects and tag the defects accordingly. The tags can include physical tags to identify a defect, or virtual tags in the form of a location identifier, an open or closed value, and a severity tier. The number of defects can include at least one level of severity. In an example, the at least one level of severity can correspond to at least one tag type. For example, the at least one tag type can include a yellow tag as the lowest level of severity, the orang tag is the middle level of severity, and the red tag is the highest level of severity. In another example, the geometry car tag collection module 314 can determine the number of defects corresponding to at least one tag type. In an example, the geometry tag collection module 314 can search a database for a particular tag type to identify corresponding segments of track. The geometry car tag collection module 314 can identify the defect count for both CSP segments and non-CSP segments.

The BFI data collection module 316, in an embodiment, can collect BFI data corresponding to the segment of track from a database. For example, the BFI data can include an average BFI value of the segment of track with corresponding ballast test dates. The average BFI value of the segment of track can include measurement from an external sensor measuring the fouling of the ballast. In another example, the external sensor can update the database at a frequency usable for the particular application (i.e., in real-time, daily, weekly, etc.). In an example, the BFI data collection module 316 can access the database and search the database according to railway information. For example, the railway information can include a particular year, a line segment of the track, a track type, a track number, and a center point of a mile post range. The database can include the BFI data for the previous year when searched by the BFI data collection module 316. In an example, when the database lacks the BFI data for the line segment for a particular date, the BFI data collection module 316 can compare previous BFI data and assign the maximum of the previous BFI data for the BFI data of the particular date.

The slow order data collection module 318, in an embodiment, can collect slow order data from a database. For example, the slow order data can include slow orders across the segment of track for a particular year. In an example, the slow order indicates when locomotives must travel at a reduced speed across the segment of track. The database can include the slow order data across the segment of track including a collection of notices for the segment of track indicating when a slow order was active and a corresponding date. In an example, when the slow order is active across the segment, the speed requirements can vary depending on a class drop requirement and a rating of the slow order. For example, when the locomotive is a Class-4 in a CSP segment and the slow order requires a class drop of 2 and a rating of 3, the slow order speed for the locomotive is equivalent to a Class-2 locomotive. In an example, when the locomotive is a Class-3 in a CSP segment and the slow order requires a class drop of 2 and a rating of 3, the slow order speed for the locomotive is equivalent to a Class-3 locomotive because the original class of the locomotive meets the rating. In another example, when the locomotive is a Class-5 in a non-CSP segment and the slow order requires a class drop of 3 and a rating of 4, the slow order speed for the locomotive is equivalent to a Class-2 locomotive. In an example, when the locomotive is a Class-4 in a non-CSP segment and the slow order requires a class drop of 3 and a rating of 4, the slow order speed for the locomotive is unchanged because the original class of the locomotive is equivalent to the rating.

The manual defect collection module 320, in an embodiment, can collect manual defect data from a database. For example, the manual defect collection module 320 can identify the total number of manual defects from the database across the segment of track. In an example, the database can update the manual defect data based on inputs from a client or external sensor from a manual or automatic inspection. For example, when an inspector identifies a defect not previously detected, the inspector will collect the manual defect data using the client or the external sensor and update the manual defect data in the database to reflect the new defect. In an example, the manual defect collection module 320 can query the database to identify the total number of manual defects. In another example, the manual defect data can include railway defect information. The railway defect information can include defects across turnouts, railway joints, among other railway defects.

In another example, the manual defect collection module 320 can collect the manual defect data from the database based on line segment, track type, track number, and mile post range. The database can return an identifier for the query. In an example, the manual defect collection module 320 can query a manual defect database using the identifier, returning the number of manual defects for the segment of track.

In one exemplary embodiment, the data parsing system 404 can include a message identification module 322, log collection module 324, and information parsing module 326. The message identification module 322, log collection module 324, and information parsing module 326 can implement one or more algorithms to access the data collected from the data collection system 402, to identify and categorize the data prior to analysis of the inspection frequency for the segment of track. The algorithms and their associated thresholds and/or signatures can be programmable to suit a particular railroad asset, application, function, facility, or other requirement. The data parsing system 404 can be configured to send and receive messages related to data collection and categorization or other suitable activity, to and from the client or server. In another exemplary embodiment, the data parsing system 404 can generate one or more elements for display on the user device. The elements can provide additional information to the user related to data storage. For example, alerts can be generated by the data parsing system 404 and displayed on the client to indicate initialization of data collection and storage, data categorization errors or completion, or other suitable information. Additionally, system symbols can be displayed on the client to indicate status of the data storage.

The message identification module 322, in an embodiment, can classify the incoming messages and any notifications from a database. For example, the message identification module 322 can receive information about the inspection frequency analysis factors from the incoming messages and the notifications. In an example, the message identification module 322 can classify the incoming messages corresponding to the inspection frequency analysis factors.

The log collection module 324, in an embodiment, can receive query responses from the database. For example, the log collection module 324 can collect the query responses from the database based on a model data fetch date. In an example, the model data fetch date can include at least the last week of data generation for the segment of track. In another example, the model data fetch date can include a user defined input for log collection. For example, the log collection module 324 can receive the query responses for a timeframe entered by a user. The log collection module 324 can organize data corresponding to the query responses based on the classification from the message identification module 322.

The information parsing module 326, in an embodiment, can transform the incoming data, messages, and notification for relevant information to the inspection frequency analysis factors. For example, the incoming messages can include information such as CSP data, MGT data, precipitation data, geometry tag data, BFI data, slow order data, and manual defect data. In an example, the information parsing module 326 can establish a connection to the database. For example, the information parsing module 326 can receive the incoming message from the database and transmit the relevant information to the database. The information transmitted to the database can include an indicator of an inspection frequency analysis is not complete, in progress, or complete.

In one exemplary embodiment, the inspection rating system 406 can include an accumulation module 328 and analysis module 330. The accumulation module 328 and analysis module 330 can implement one or more algorithms to connect to a network to communicate with another system of the railroad inspection system 400, ultimately to analyze and assign a score to the data to determine an inspection frequency. The algorithms and their associated thresholds and/or signatures can be programmable to suit a particular railroad asset, application, function, facility, or other requirement. The network management system 202 can be configured to send and receive messages related to an inspection or other suitable activity, to and from the client or server. In another exemplary embodiment, the inspection rating system 406 can generate one or more elements for display on the user device. The elements can provide additional information to the user related to the inspection frequency. For example, alerts can be generated by the inspection rating system 406 and displayed on the client to indicate current and future inspection frequency, factors used to determine inspection frequency, changes in the inspection frequency, or other suitable information. Additionally, system symbols can be displayed on the client to indicate user defined variables for assigning the score the segment of track.

The rating module 328, in an embodiment, can transform the data into ratings for each inspection frequency analysis factors. For example, the inspection frequency analysis factors can include the CSP data, the MGT data, the precipitation data, the geometry tag data, the BFI data, the slow order data, and the manual defects data. The rating module 328 can transform the ratings corresponding to values of each of the inspection frequency analysis factors. For example, the rating module 328 can assign values between 0-5 depending on a severity of the inspection frequency analysis factor. In an example, the coded score disclosed in FIG. 1 applies to the values for the inspection frequency analysis factors.

The accumulation module 330, in an embodiment, can calculate a total score for the ratings. For example, the accumulation module 330 can add each of the ratings together to generate a value for the total score. In an example, the accumulation module 330 can determine when the segment of track includes at least one rail joint. When the segment of track includes rail joint, the accumulation module 330 multiples the total score by a user defined multiplier. For example, the user defined multiplier is 1.5. In an example, the total score can include a maximum value of 48.5 based on the inspection frequency analysis factors.

The analysis module 332, in an embodiment, can determine an inspection frequency based on an inspection frequency classification model. For example, the inspection frequency classification model can classify the inspection frequency based on the total score for the ratings. In an example, the analysis module 332 can identify whether the total score is categorized for a low inspection frequency, a medium inspection frequency, or a high inspection frequency. In an example, when the total score is below 6, the analysis module 332 assigns the low inspection frequency to the segment of track. In another example, when the total score is between 6 and 12, the analysis module 332 assigns the medium inspection frequency to the segment of track. In another example, when the total score is greater than 12, the analysis module 332 assigns the high inspection frequency to the segment of track. In an example, the analysis module 332 can determine when the aggregated daily MGT from a latest geometry car test date. When the aggregated daily MGT from the latest geometry car test date is greater than or equal to 12, the analysis module 332 increases the inspection frequency. In an example, when the inspection frequency is one time per week, the analysis module 332 increases the inspection frequency to three times per week. In an example, when the inspection frequency is two times per month, the analysis module 332 increases the inspection frequency to one time per week.

Figure 5:
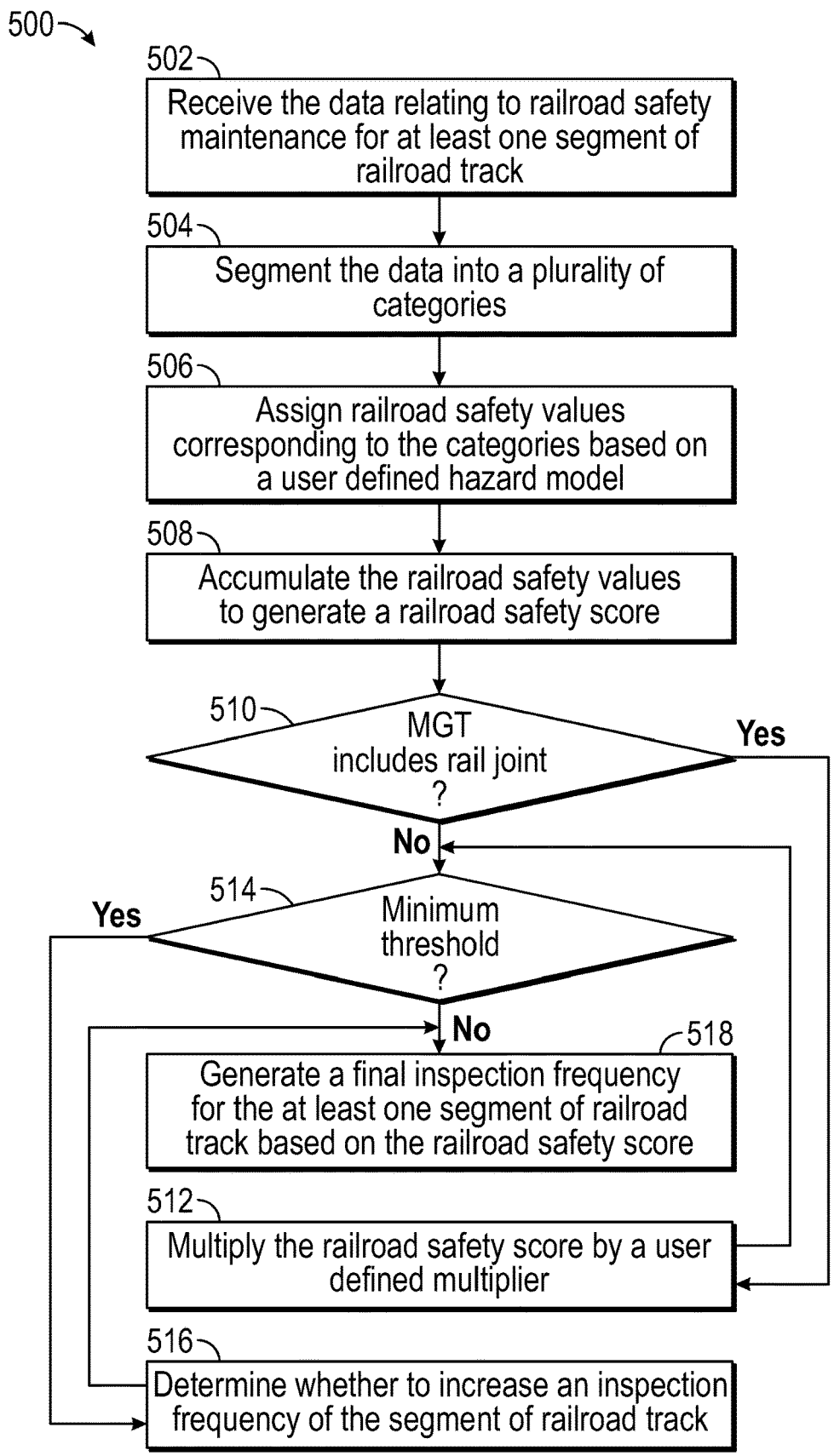
FIG. 5 illustrates railroad inspection control logic, in accordance with one or more exemplary embodiments of the present disclosure.

FIG. 5 illustrates railroad inspection control logic 500, in accordance with one or more exemplary embodiments of the present disclosure. The railroad inspection control logic 500 can be implemented as an algorithm on a server 302, a machine learning module, a client (e.g., clients 350, 352, 354), a database, or other suitable system. Additionally, the railroad inspection control logic 500 can implement or incorporate one or more features of the railroad inspection system 400, including the data collection system 402, data parsing system 404, and inspection rating system 406. The railroad inspection control logic 500 can be achieved with software, hardware, firmware, an API, a network connection, a network transfer protocol, HTML, DHTML, JavaScript, Dojo, Ruby, Rails, other suitable applications, or a suitable combinations thereof.

The railroad inspection control logic 500 can leverage the ability of a computer platform to spawn multiple processes and threads by processing data simultaneously. In an embodiment, the railroad inspection control logic 500 can implement a memory for storing the acquired data relating to the railroad safety maintenance and an inspection frequency classification model to transform the acquired data from a raw form to a final inspection frequency value. In another embodiment, the railroad inspection control logic 500 can instantiate instructions for a processor that is configured to transform the acquired data relating to the railroad safety maintenance from the raw form to the final inspection frequency value. The speed and efficiency of the railroad inspection control logic 500 can be greatly improved by instantiating more than one process to implement parallel railroad asset inspections. However, one skilled in the art of programming will appreciate that use of a single processing thread may also be utilized and is within the scope of the present disclosure. The railroad inspection control logic 500 of the present embodiment begins at step 502.

At step 502, in an embodiment, the control logic 500 can receive the data relating to railroad safety maintenance for at least one segment of railroad track. For example, the control logic 500 can receive data from the data collection system 402 shown in FIG. 4. In an example, the control logic 500 can acquire the data relating to railroad safety maintenance from a database including CSP data, MGT data, precipitation data, geometry car tag data, BFI data, slow order data, and manual defect data, or any combination of the foregoing data. In an example, the data can be structured or unstructured. For example, the control logic 500 can execute database access instructions corresponding to the structured data with particular variables in the instructions to receive according to the structure of the data. In an example, the control logic 500 can execute SQL database instructions indicating the segment of track and data factors to receive. The control logic 500 then proceeds to step 504.

At step 504, in an embodiment, the control logic 500 can segment the data into a plurality of categories. For example, the data can originate from a plurality of sources. In an example, the data can include unique identifiers for each of the sources. The control logic 500 can segment the data by comparing the unique identifiers of the sources with category labels matching to the unique identifiers. For example, the control logic 500 can include unique numeric identifiers associated with each of the railroad safety maintenance factors. In an example, the control logic 500 can organize the data based on the categories such as CSP values, MGT values, precipitation values, geometry car tag values, BFI values, slow order values, and manual defect values. In an example, the geometry car tag values can include an open tag or a closed tag. The open tag can indicate the segment of track includes an active defect. The closed tag can indicate the segment of track includes a fixed defect. For example, the open tag can convert to the closed tag when the defect corresponding to the open tag is fixed. In another example, the open tag and the closed tag can include various levels of tag types. For example, the tag types can include a first tag type, a second tag type, and a third tag type. The first tag type can represent a minor issue with the segment of track. The second tag type can represent a moderate issue with the segment of track. The third tag type can represent a critical issue with the segment of track. In another example, each of the categories corresponds with one of the unique identifiers. In another example, the control logic 500 can identify the category the data belongs based on comparing the data to expected values and assigning the data to a category matching the expected values. The control logic 500 can assign the data to the category based on predetermined conditions according to units associated to the data. The control logic 500 then proceeds to step 506.

At step 506, in an embodiment, the control logic 500 can assign railroad safety values corresponding to the categories based on a user defined hazard model. For example, each of the categories can correspond to an independent railroad safety value of the railroad safety values. In an example, one of the railroad safety values corresponding to a first CSP value for a first segment of track, which can be different from another of the railroad safety values corresponding to a second CSP value for a second segment of track. For example, the first segment of track can include various known non-compliant characteristics leading to a maximum CSP value, while the second segment of track can include totally compliant characteristics leading to a minimum CSP value. The control logic 500 can assign the railroad safety values as described in FIG. 1. The control logic 500 then proceeds to step 510.

At step 508, in an embodiment, the control logic 500 can aggregate the railroad safety values to generate a railroad safety score. For example, the control logic 500 can add together the railroad safety values to generate the railroad safety score. The control logic 500 then proceeds to step 510.

At step 510, in an embodiment, the control logic 500 can determine whether MGT data includes information identifying rail joints. For example, the MGT data can include a variable indicating whether the segment of track includes at least one rail joint. The variable can be binary, where a "0" can represent the segment of track lacks any rail joints and a "1" can represent the segment of track includes rail joints. If the control logic 500 determines the MGT data includes information identifying rail joints, the control logic 500 then proceeds to step 512. If the control logic 500 determines the MGT data includes information without rail joints, the control logic 500 then proceeds to step 514.

At step 512, in an embodiment, the control logic 500 can multiply the railroad safety score by a user defined multiplier. For example, the user defined multiplier can be 1.5. The user defined multiplier can be modified based on input from the user. The control logic 500 can receive input from the user to update the multiplier to a new value. The control logic 500 then proceeds to step 514.

At step 514, in an embodiment, the control logic 500 can determine whether the inspection frequency meets a minimum inspection frequency threshold. For example, the control logic 500 can measure the MGT across the segment of track over a period of time and compare the MGT to the minimum inspection frequency threshold. For example, the minimum inspection frequency threshold can include a predefined MGT representing a limit for the segment of track. In an example, when the MGT across the segment of track is greater than the predefined MGT, the control logic 500 can elevate the inspection frequency. In another example, the period of time can include a timeframe between inspections according to the inspection frequency. In an example, the inspection frequency can correspond to a tiered structure. For example, the minimum inspection frequency threshold can be a first tier, a second tier, or a third tier. In an example, the first tier is a lowest frequency for inspection purposes, the second tier is a medium frequency for inspection, and the third tier is a highest frequency for inspection. The first tier can include a frequency of two inspections per month. The second tier can include a frequency of one inspection per week. The third tier can include a frequency of three inspections per week. The control logic 500 can compare the inspection frequency with the known inspection frequencies to determine whether the inspection frequency meets the minimum inspection frequency threshold. For example, the minimum inspection frequency threshold can be the first tier. If the inspection frequency meets the minimum inspection frequency threshold, the control logic 500 then proceeds to step 518. If the inspection frequency does not meet the minimum inspection frequency threshold, the control logic 500 then proceeds to step 516.

At step 516, in an embodiment, the control logic 500 can determine whether to increase an inspection frequency of the segment of track. For example, when the inspection frequency is equal to or greater than the minimum inspection frequency threshold, the control logic 500 can elevate the inspection frequency for the segment of track to the next tier of the tiered structure. In an example, if the inspection frequency is two inspections per month, the control logic 500 can elevate the inspection frequency to one inspection per week. In another example, if the inspection frequency is one inspection per week, the control logic 500 can elevate the inspection frequency to three inspections per week. The control logic 500 then proceeds to step 518.

At step 518, in an embodiment, the control logic 500 can generate a final inspection frequency for the at least one segment of track based on the railroad safety score. The control logic 500 can generate the final inspection frequency with respect to the information corresponding to whether the segment of track includes rail joints and the MGT across the segment of track over the period of time. The control logic 500 then terminates or awaits a new inspection creation request and can repeat the aforementioned steps.

FIGS. 6A-C and FIG. 7 provide an exemplary embodiment of identifying railway asset defects across four segments of track (i.e., track segments 602-608) and a corresponding process. The segments of track can extend indefinitely on either side, only a section of track is presented. These examples are intended to facilitate an understanding of the ways in which the disclosure can be implemented and practiced and should not limit the disclosure to only these examples.

FIGS. 6A-6C illustrate exemplary diagrams for a railroad inspection system 600, in accordance with one or more exemplary embodiments of the present disclosure. The diagrams illustrate the railroad inspection system 600 with marked railroad asset defects along various segments of track based on geometry car testing and defect tagging. The diagram 600 can include track segments 602-608 and at least one marked railroad asset defect 610.

The track segments 602-608 can correspond to mile post ranges of a segment of a track. For example, track segment 602 can correspond to a mile post range between MP 100 and MP 200, where MP 100 is on the left-most side of the track segment 602 and MP 200 is on the right-most side of the track segment 602. The track segment 606 can correspond to a mile post range between MP 200 and MP 300, where MP 200 is on the left-most side of the track segment 606 and MP 300 is on the right-most side of the track segment 606. The track segment 604 can correspond to a mile post range parallel to the track segment 602 between MP 90 and MP 190, where MP 90 is on the left-most side of the track segment 604 and MP 190 is on the right-most side of the track segment 604. The track segment 608 can correspond to a mile post range parallel to the track segment 606 between MP 190 and MP 290, where MP 190 is on the left-most side of the track segment 608 and MP 290 is on the right-most side of the track segment 608.

The system 600 can illustrate the path along the track segments 602-608 a locomotive can travel across based on a geometry of the track segments 602-608. For example, the track segment 602 includes a rail joint from the track segment 602 to the track segment 604, so a locomotive can travel from the track segment 602 to the track segment 604. In an example, a geometry car will travel along the track segments 602-608 in every applicable geometry of the track segments 602-608 to identify the at least one marked railroad asset defect 610. In another example, the track segments 602-608 can include incremental measurements for normalized analysis. For example, the track segments 602-608 can all include the incremental measurements at equal lengths according to mile post measurements. For example, each of the track segments 602-608 can include the incremental measurement of 100 MP. In this way, the track segments 602-608 can all be compared to one another for accurate comparisons of relative track segment status. The relative track segment status can correspond to the at least one marked railroad asset defect 610 among other railway factors to determine an inspection frequency.

The at least one marked railroad asset defect 610 can represent a hazardous point along the track segments 602-608. For example, track segment 602 can include three defects as shown in FIG. 6. In an example, track segment 604 can include one defect as shown in FIG. 6. In another example, track segment 606 can include five defects as shown in FIG. 6. In another example, track segment 608 can include nine defects as shown in FIG. 6. In an example, the at least one marked railroad asset defect 610 can correspond to geometry tag data including the coded score according to defect severity (i.e., the geometry tag data 108 of FIG. 1). In an example, the defects can include a first tag, type, a second tag type, and a third tag type. In another example, the defects can include an open tag and a closed tag.

In an embodiment, referring to FIG. 6A, the system 600 can be used to analyze the inspection frequency along each of the track segment 602-608. For example, based strictly on the number of defects, the inspection frequency for track segment 604 can be lower frequency than the other track segments because track segment 604 has the fewest defects. In another example, the track segment 604 can include other factors impacting the inspection frequency which could increase the inspection frequency upon analysis. For example, the track segment 604 can include a highest degree of MGT across the track segment 604, which would elevate a total rating for the track segment 604. The total rating of the track segment 604 corresponds with the inspection frequency. In another example, the track segment 604 can include rail joints, which would lead to the total rating being multiplied by a user defined multiplier upon analysis. The additional factors to the number of defects can impact the total rating, which can lead to an increased inspection frequency.

In another example, referring to FIG. 6B, based completely on the number of defects, the inspection frequency for track segment 608 can be higher frequency than the other track segments because track segment 608 has the greatest number of defects. The inspection frequency of the track segment 608 can correspond to the types of tags corresponding to the defects. For example, the track segment 608 can include nine defects, where eight defects are closed tags and one defect is an open tag that is the first tag type. Additionally, the track segment 604 can include one defect, where the defect is an open tag that is the third tag type. In this case, based strictly on the number and type of defects, the track segment 608 can include a lower inspection frequency than the track segment 604.

In another example, referring to FIG. 6C, the inspection frequency for the track segments 602-608 can be based on a plurality of categories of railroad safety data. For example, in addition to the at least one marked railroad asset defect 610, the categories can include CSP values, MGT values, precipitation values, geometry car tag values, BFI values, slow order values, and manual defect values. The inspection frequency of each of the track segments 602-608 can correspond to an analysis of the above categories of railroad safety data.

Figure 7:
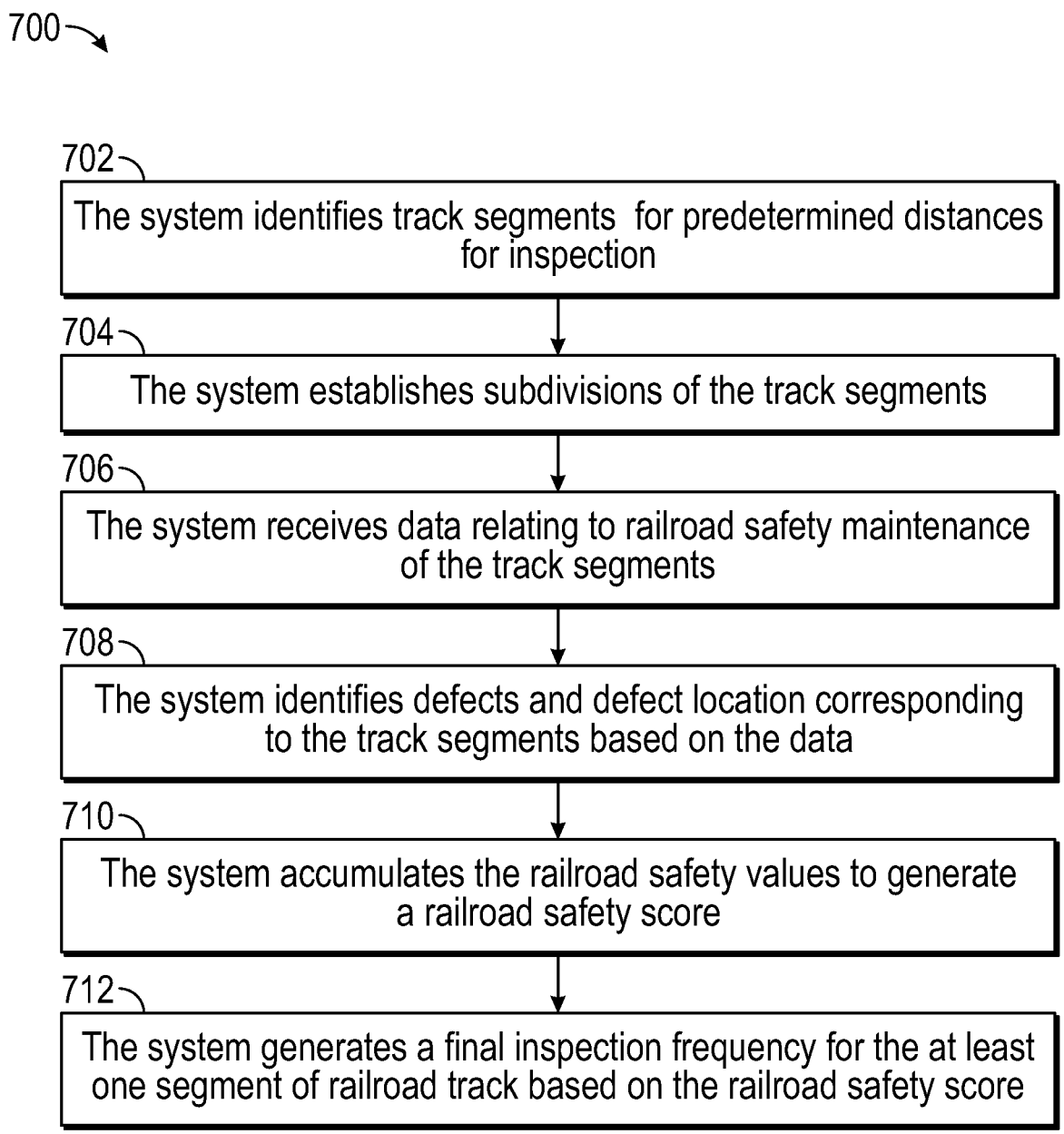
FIG. 7 illustrates a process for railroad inspection, in accordance with one or more exemplary embodiments of the present disclosure.

Referring to FIG. 7 as a process for railroad inspection 700, in accordance with one or more exemplary embodiments of the present disclosure. The process for railroad inspection 700 of the present embodiment begins at step 702. At step 702, in an embodiment, the process 700 can instruct a system to identify track segments for predetermined distances for inspection purposes. The process 700 then proceeds to step 704. At step 704, in an embodiment, the process 700 can instruct the system to establish subdivisions of the track segments. The process 700 then proceeds to step 706. At step 706, in an embodiment, the process 700 can instruct the system to receive data relating to railroad safety maintenance of the track segments. The process 700 then proceeds to step 708. At step 708, in an embodiment, the process 700 can instruct the system to identify defects and defect locations corresponding to the track segments based on the data. The process 700 then proceeds to step 710. At step 710, in an embodiment, the process 700 can instruct the system to aggregate the railroad safety values to generate a railroad safety score. The process 700 then proceeds to step 712. At step 712, in an embodiment, the process 700 can instruct the system to generate a final inspection frequency for the at least one segment of railroad track based on the railroad safety score.

The present disclosure achieves at least the following advantages:

1. Generating a comprehensive, data-driven inspection frequency model based on measured physical factors relevant for determining an optimum visual inspection frequency for a segment of track.
2. Transforming data corresponding to physical factors across a segment of track to identify a visual inspection frequency.
3. Complying with relevant federal regulations corresponding to inspection of railroad.
4. Normalizing data across various segments of track to accurately determine an inspection frequency for the segments of track.
5. Assigning safety ratings to segments of track based on measured data values for physical factors associated with railway travel.
6. Enhancing safety for passengers and cargo along railways by determining optimum inspection frequencies for the segments of track.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A railroad inspection system for minimizing safety hazards along a railroad track, comprising:
   one or more sensors disposed at one or more physical locations along a segment of track configured to collect data related to an inspection frequency for the segment of track; and
   one or more computer processors configured to:
   communicate the data related to the inspection frequency for the segment of track;
   assign a score to the data related to the inspection frequency for the segment of track;
   classify the inspection frequency based at least in part on the assigned score;
   transform incoming data, messages, or notifications into one or more inspection frequency analysis factors; and
   generate an alert for display on a client device to indicate current and future inspection frequency, factors used to determine inspection frequency, and changes in inspection frequency.

2. The system of claim 1, the one or more computer processors further configured to generate one or more elements that provide additional information related to an inspection for display on the client device.

3. The system of claim 1, the one or more computer processors further configured to generate an alert or symbol for display on the client device to indicate data collection status.

4. The system of claim 1, the one or more computer processors further configured to collect one or more comprehensive service plans (CSPs) for the segment of track.

5. The system of claim 1, the one or more computer processors further configured to collect million gross tons (MGT) data across the segment of track for a particular year.

6. The system of claim 1, the one or more computer processors further configured to classify the incoming messages or notifications from a database.

7. The system of claim 6, the one or more computer processors further configured to receive information about the inspection frequency analysis factors from incoming messages or notifications.

8. The system of claim 7, the one or more computer processors further configured to classify the incoming messages according to one or more inspection frequency analysis factors.

9. The system of claim 1, the one or more computer processors further configured to transmit an indicator indicating whether an inspection frequency analysis is not complete, in progress, or complete.

10. The system of claim 1, the one or more computer processors further configured to generate alerts for display on the client device to indicate current and future inspection frequency, factors used to determine inspection frequency, and changes in the inspection frequency.

11. A method for minimizing safety hazards along a railroad track via a railroad inspection system, comprising:
   collecting data related to an inspection frequency for a segment of track via one or more sensors disposed at one or more physical locations along the segment of track;
   communicating the data related to the inspection frequency for the segment of track;
   assigning a score to the data related to the inspection frequency for the segment of track;
   classifying the inspection frequency based at least in part on the assigned score;
   transforming incoming data, messages, or notifications into one or more inspection frequency analysis factors; and
   generating an alert for display on a client device to indicate current and future inspection frequency, factors used to determine inspection frequency, and changes in inspection frequency.

12. The method of claim 11, further comprising generating one or more elements that provide additional information related to an inspection for display on the client device.

13. The method of claim 11, further comprising generating an alert or symbol for display on the client device to indicate data collection status.

14. The method of claim 11, further comprising collecting collect one or more comprehensive service plans (CSPs) for the segment of track.

15. The method of claim 11, further comprising collecting million gross tons (MGT) data across the segment of track for a particular year.

16. The method of claim 11, further comprising classifying the incoming messages or notifications from a database.

17. The method of claim 16, further comprising receiving information about the inspection frequency analysis factors from incoming messages or notifications.

18. The method of claim 17, further comprising classifying the incoming messages according to one or more inspection frequency analysis factors.

19. The method of claim 11, further comprising transmitting an indicator indicating whether an inspection frequency analysis is not complete, in progress, or complete.

20. The method of claim 11, further comprising generating alerts for display on the client device to indicate current and future inspection frequency, factors used to determine inspection frequency, and changes in the inspection frequency.

* * * * *